US011565439B2

United States Patent
Niimi et al.

(10) Patent No.: US 11,565,439 B2
(45) Date of Patent: Jan. 31, 2023

(54) SLURRY DELIVERY CONDUIT OF MIXER AND SLURRY DELIVERY METHOD

(71) Applicant: YOSHINO GYPSUM CO., LTD., Tokyo (JP)

(72) Inventors: Katsumi Niimi, Tokyo (JP); Shinobu Kaneko, Tokyo (JP)

(73) Assignee: YOSHINO GYPSUM CO., LTD., Tokyo (JP)

( * ) Notice: Subject to any disclaimer, the term of this patent is extended or adjusted under 35 U.S.C. 154(b) by 331 days.

(21) Appl. No.: 16/644,051

(22) PCT Filed: Sep. 1, 2018

(86) PCT No.: PCT/JP2018/032510
§ 371 (c)(1),
(2) Date: Mar. 3, 2020

(87) PCT Pub. No.: WO2019/058936
PCT Pub. Date: Mar. 28, 2019

(65) Prior Publication Data
US 2020/0406498 A1    Dec. 31, 2020

(30) Foreign Application Priority Data

Sep. 19, 2017   (JP) .............................. JP2017-178937

(51) Int. Cl.
*B28B 19/00*   (2006.01)
*B05B 1/14*   (2006.01)

(52) U.S. Cl.
CPC ............ *B28B 19/0092* (2013.01); *B05B 1/14* (2013.01)

(58) Field of Classification Search
None
See application file for complete search history.

(56) References Cited

U.S. PATENT DOCUMENTS

| 1,905,733 A | 4/1933 | Moore |
| 3,266,974 A | 8/1966 | Staver, Jr. |

(Continued)

FOREIGN PATENT DOCUMENTS

| GB | 1 516 806 | 7/1978 |
| JP | 8-128582 | 5/1996 |

(Continued)

OTHER PUBLICATIONS

International Search Report dated Nov. 13, 2018, In corresponding International Patent Application No. PCT/JP2018/032510.

(Continued)

*Primary Examiner* — Jeffry H Aftergut
(74) *Attorney, Agent, or Firm* — Staas & Halsey LLP

(57) ABSTRACT

An object of the invention is to prevent differences in the flow rate and the specific gravity of a gypsum slurry from being caused between slurry discharge ports, to divide a current of the slurry into streams without a factor of stagnation of the slurry provided at a branch part, and also, to ensure a sufficient distance between the discharge ports. The slurry delivery conduit (10) has a rectilinear tube segment (14), a branch part (15) and branch tube segments (16). A tube-wall joint portion (20) of the branch tube segments configures a counter-flow splitting element (22) in a form of V-letter at the branch part. The slurry is introduced from a mixing area (51) into the rectilinear tube segment, which configures a straight rectilinear fluid passage. The rectilinear tube segment rectifies a flow of the slurry to be an axial or rectilinear current (S), and the axial or rectilinear current is split into branch streams (S1, S2) by the counter-flow splitting element.

20 Claims, 11 Drawing Sheets

(56) References Cited

U.S. PATENT DOCUMENTS

| | | | |
|---|---|---|---|
| 4,288,263 | A | 9/1981 | Delcoigne et al. |
| 5,350,290 | A | 9/1994 | Honings |
| 6,193,402 | B1 | 2/2001 | Grimland et al. |
| 6,193,408 | B1 | 2/2001 | Miura et al. |
| 6,494,609 | B1 | 12/2002 | Wittbold et al. |
| 7,690,834 | B2 | 4/2010 | Nakamura et al. |
| 8,685,188 | B2 | 4/2014 | Yamaji et al. |
| 9,856,168 | B2 | 1/2018 | Ueno et al. |
| 2003/0117891 | A1 | 6/2003 | Wittbold et al. |
| 2006/0244182 | A1 | 11/2006 | Wittbold et al. |
| 2008/0151681 | A1 | 6/2008 | Eigenmann et al. |
| 2013/0098268 | A1 | 4/2013 | Li et al. |
| 2013/0100759 | A1* | 4/2013 | Wittbold ............... F16L 41/023 137/561 A |
| 2015/0231799 | A1 | 8/2015 | Wittbold et al. |
| 2018/0008993 | A1* | 1/2018 | Todd ...................... F16L 3/227 |

FOREIGN PATENT DOCUMENTS

| | | |
|---|---|---|
| JP | 2000-296512 | 10/2000 |
| JP | 2001-300933 | 10/2001 |
| JP | 2014-530779 | 11/2014 |
| RU | 2599396 C2 | 12/2011 |
| RU | 2599399 C2 | 12/2011 |
| SU | 997781 A1 | 2/1983 |
| SU | 1009273 A | 3/1983 |
| WO | 97/23337 | 7/1997 |
| WO | 98/25069 A1 | 6/1998 |
| WO | WO00/56435 | 9/2000 |
| WO | WO 2004/026550 | 4/2004 |
| WO | WO2004/103663 | 12/2004 |
| WO | 2012/092534 | 7/2012 |
| WO | 2012/092582 | 7/2012 |
| WO | WO 2013/063055 | 5/2013 |
| WO | WO 2014/087892 | 6/2014 |
| WO | 2018/009389 A1 | 1/2018 |
| WO | 2018/071351 A1 | 4/2018 |

OTHER PUBLICATIONS

Russian Search Report dated Apr. 22, 2021 from Russian Application No. 2020113699.
International Preliminary Report on Patentability dated Mar. 24, 2020 and Written Opinion of the International Searching Authority dated Nov. 13, 2018 from International Application No. PCT/JP2018/032510.
Russian Office Action dated Apr. 23, 2021 from Russian Application No. 2020113699.
Indian Office Action dated Aug. 25, 2021 from Indian Application No. 202037008197.
Australian Office Action dated Dec. 2, 2021 from Australian Application No. 2018334617.
Extended European Search Report dated Mar. 16, 2022 from European Application No. 18858875.0.

* cited by examiner

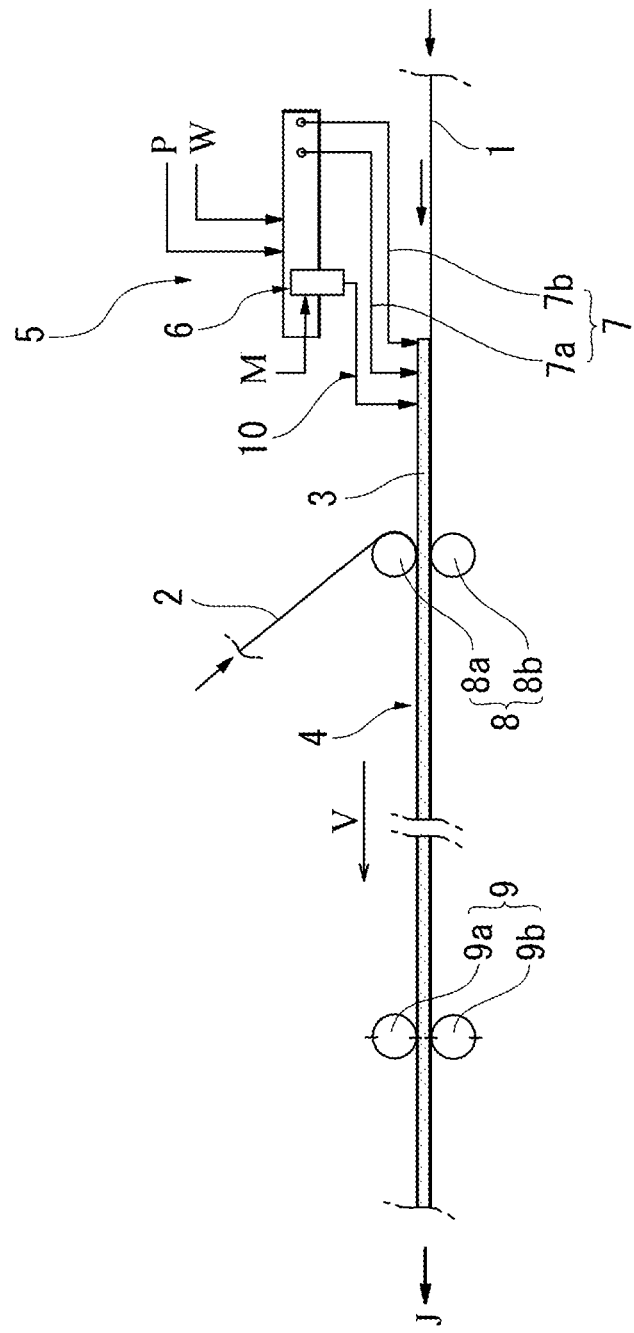

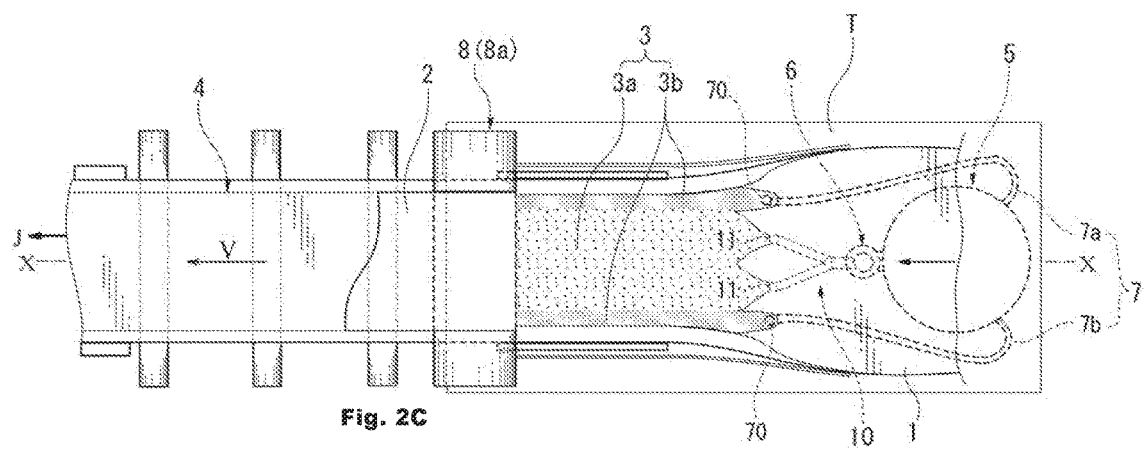
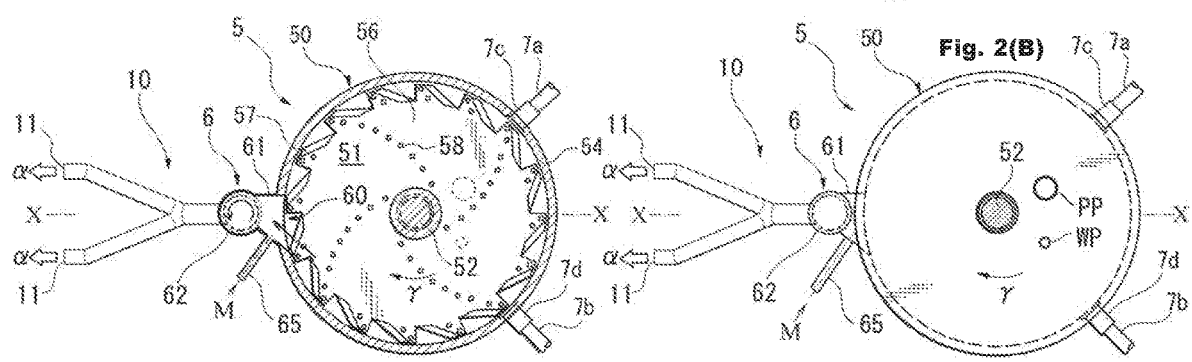

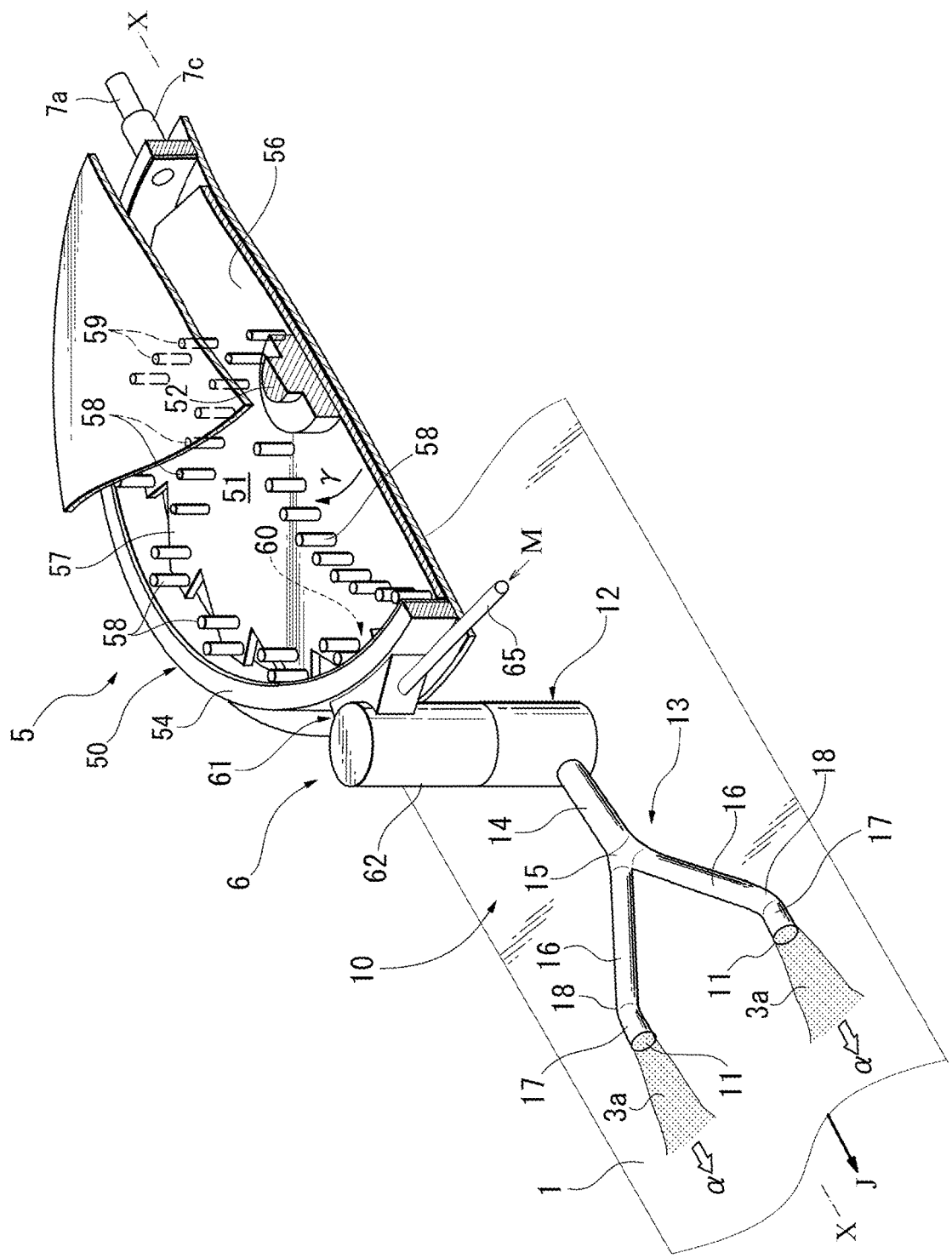
[FIG.3]

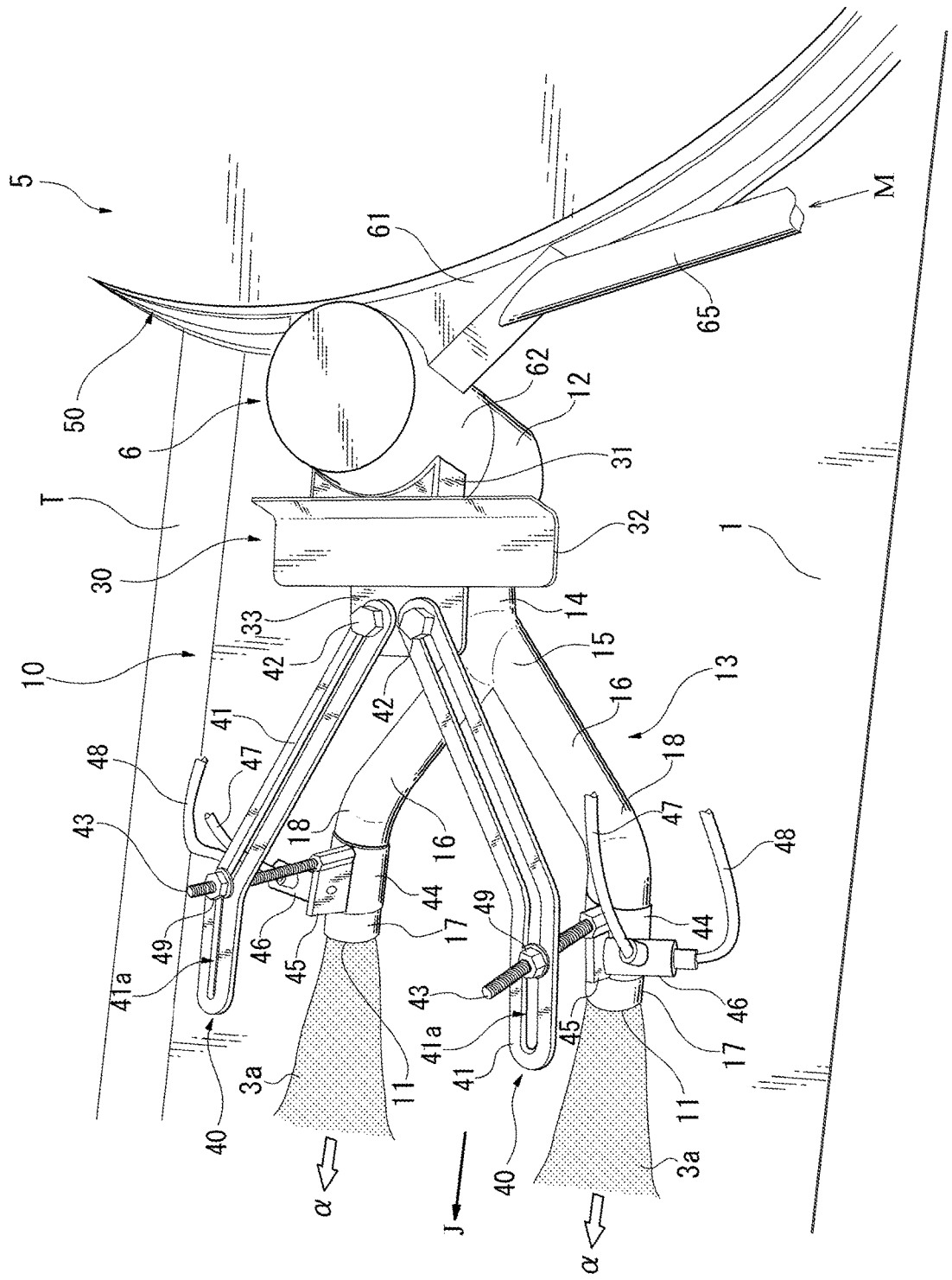
[FIG.4]

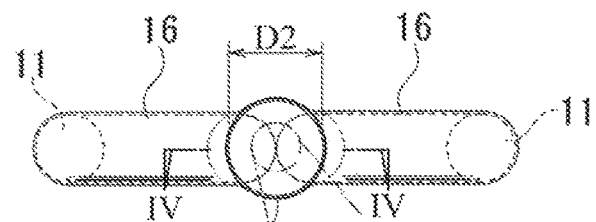
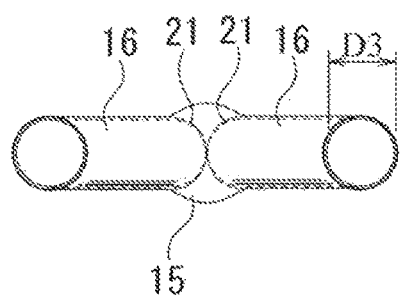
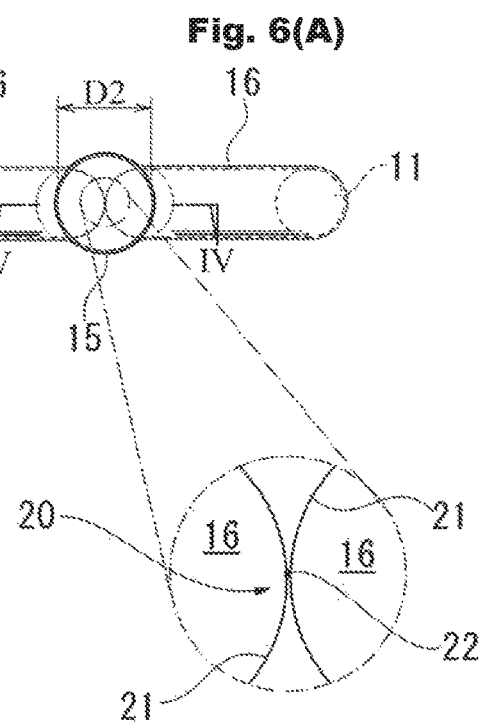
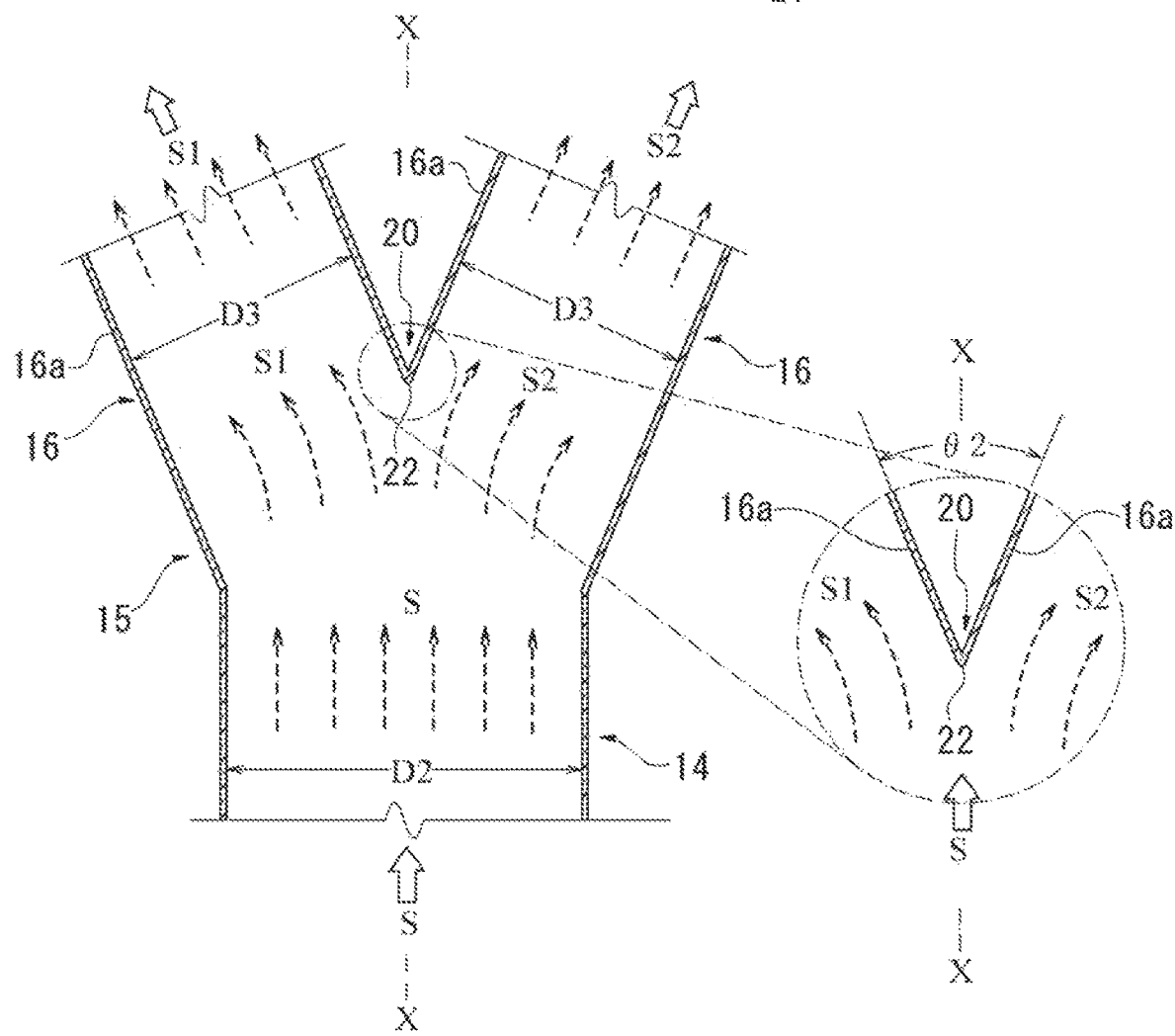

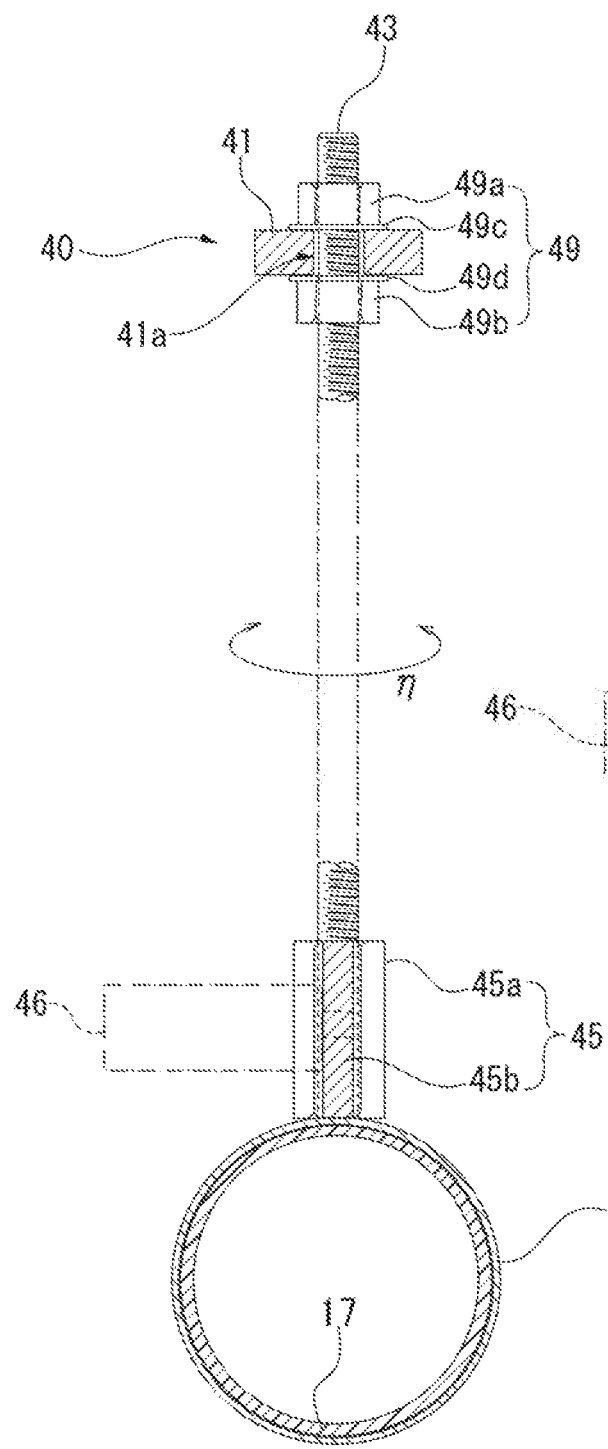
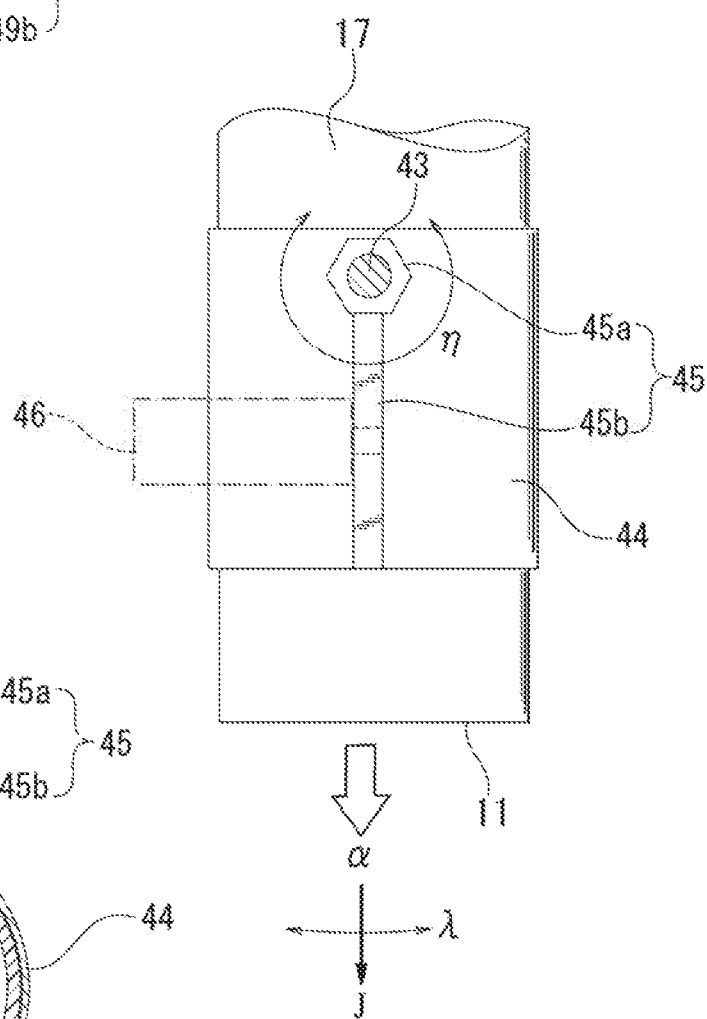
Fig. 7(A)
Fig. 7(B)

SLURRY DELIVERY CONDUIT OF MIXER AND SLURRY DELIVERY METHOD

CROSS-REFERENCE TO RELATED APPLICATIONS

This application is a U.S. National Stage Application which claims the benefit under 35 U.S.C. § 371 of International Patent Application No. PCT/JP2018/032510 filed on Sep. 1, 2018, which claims foreign priority benefit under 35 U.S.C. § 119 of Japanese Patent Application No. 2017-178937 filed on Sep. 19, 2017, in the Japanese Intellectual Property Office, the contents of all of which are incorporated herein by reference.

TECHNICAL FIELD

The present invention relates to a slurry delivery conduit of a mixer and a slurry delivery method, and more specifically, a bifurcation type or distribution type of slurry delivery conduit, with which the mixer is provided for dividing a current of a gypsum slurry of the mixer into streams and delivering the slurry onto a sheet of paper for gypsum board liner, and a method for delivering such a slurry.

BACKGROUND ART

A gypsum board is known in the art as a board having a gypsum core covered with sheets of paper for gypsum board liner, and is widely used in various kinds of buildings as an architectural interior finish material, because of its advantageous fire-resisting or fire-protecting ability, sound insulation performance, workability, cost performance and so on. In general, the gypsum board is produced by a continuous slurry pouring and casting process. This process comprises a mixing step for admixing calcined gypsum, adhesive auxiliary agent, set accelerator, foam (or foaming agent), and other additives, admixtures and so forth, with mixing water in a mixer; a forming step for pouring a calcined gypsum slurry prepared in the mixer (referred to as "gypsum slurry" or "slurry" hereinafter) into a space between sheets of paper for gypsum board liner and forming them to be a continuous belt-like formation having a plate-like configuration; and a drying and cutting step for roughly cutting the solidified continuous belt-like layered formation, drying it forcibly and thereafter, trimming it to have a product size.

A thin type of circular centrifugal mixer is known in the art as the mixer for preparing the gypsum slurry by mixing the calcined gypsum, water and so forth. This type of mixer comprises a flattened circular casing and a rotary disc rotatably positioned in the casing. A plurality of material feeding ports for feeding the above constituent materials into the mixer are disposed in a center region of a top cover or an upper plate of the casing, and a slurry outlet port for delivering a mixture (a slurry) out of the mixer is provided on the periphery of the casing or on a lower plate (bottom cover) thereof. The ingredients to be mixed are supplied onto the rotary disc through the respective feeding ports, and they are mixed while being moved radially outward on the disc under an action of centrifugal force, and then, delivered out of the mixer through the slurry outlet port, which are positioned on the periphery or the lower plate (bottom plate). The mixer with this arrangement is disclosed in, e.g., International Publication of PCT Application No. WO00/56435 (Patent Literature 1).

As regards a method for delivering the slurry prepared in the mixer to the outside of the mixer, the following three kinds of methods are mainly known in the art:

(1) A vertical chute, which is also called as a "canister", is attached to a slurry outlet port provided on an annular wall of the casing, and the slurry on the rotary disc is delivered into the chute under the action of centrifugal force, so that the slurry flowing into the chute is gravitationally discharged onto the sheet of paper for gypsum board liner (International Publication of PCT Application No. WO2004/026550 (Patent Literature 2));

(2) A tubular passage for transporting the slurry is transversely connected to the slurry outlet port provided on the annular wall of the casing, so that the slurry is discharged onto the sheet of paper with use of a delivery pressure of the mixer (U.S. Pat. No. 6,494,609 (Patent Literature 3));

(3) A slurry delivery tubular passage is vertically connected to the slurry outlet port provided on the lower plate of the casing, so that the slurry is gravitationally discharged onto the sheet of paper through the tubular delivery passage (Japanese Patent Laid-Open Publication No. 2001-300933 (Patent Literature 4)).

In general, a quantity of foam or foaming agent is fed to the slurry in the mixer, in order to regulate or adjust the specific gravity of the gypsum board. Proper mixing of the foam or foaming agent with the slurry is considered to be essential for reduction in the weight of the gypsum board. Therefore, in the method for producing gypsum boards in recent years, a technique for properly mixing an appropriate quantity of foam or foaming agent with the slurry is considered to be especially important. As regards reduction in a supply amount of foam or foaming agent and uniform mixing of the slurry and the foam, it is considered that a relation is very important between a method for feeding the foam or foaming agent to the slurry and a method for delivering the slurry (Patent Literatures 2 and 3).

For instance, each of International Publications of PCT Applications Nos. WO2014/087892 and WO2004/103663 (Patent Literatures 5 and 6) discloses a technique intended to attain homogeneous dispersion and distribution of the foam or foaming agent in the slurry with use of a slurry swirling flow in a vertical chute.

The slurry delivered from the mixer in such a method for delivering the slurry is discharged onto an upper surface of the sheet of paper for gypsum board liner through a slurry discharge port of a slurry delivery conduit. The conduit configures, in general, a curved or L-shaped fluid passage. This kind of fluid passage is, in general, called as a "boot(s)", a "discharge boot(s)", or the like. The sheet of paper for gypsum board liner is a continuous belt-like material with a width of about 1 m, which is continuously conveyed on a production line of a gypsum board production apparatus in a relatively high speed. A bifurcation type or distribution type of boot is known in the art, which has a plurality of slurry discharge ports spaced apart from each other in a widthwise direction of the sheet, in order to pour and spread the slurry uniformly on the sheet throughout the overall width of the sheet. For instance, a "multi-leg discharge boot", which is disclosed in International Publications of PCT Application No. WO2013/063055 (Japanese patent laid-open publication No. 2014-530779) (Patent Literature 7), is such a bifurcation type or distribution type of boot having a pair of left and right slurry discharge ports for discharging the slurry prepared by the mixer onto the sheet.

FIG. 10 includes a plan view and a side elevational view showing a structure of the conventional slurry delivery conduit. FIG. 11 includes a perspective view and a cross-sectional view taken along line V-V, which show a structure of the slurry delivery conduit as disclosed in Patent Literature 7.

A boot 100 as shown in FIG. 10 has a vertical tube 101 generally in a cylindrical form and a pair of left and right slurry delivery tubes 103. A center axis Z-Z of the tube 101 is oriented in a vertical direction. The tubes 103 are connected to the tube 101 at a lower part 102 reduced in its diameter. An opening at a terminal end of each of the tubes 103 defines a slurry discharge port 104 which discharges the slurry as shown by an arrow α. The ports 104 discharges the slurry onto an upper surface of the sheet of paper for gypsum board liner 110 (illustrated by one dotted chain lines), which runs in a direction of an arrow J. The conveying direction J of the sheet 110 is in parallel with the center axis X-X of the production line of the gypsum board production apparatus. Each of the tubes 103 is a rectilinear tube, which extends straightly in a direction at an angle θa/2 with respect to the center axis X-X of the production line of the apparatus as seen in the plan view (FIG. 10 (A)), and which extends straightly and obliquely downward from the lower portion 102 as seen in the side elevational view (FIG. 10 (B)). A divergent angle θa of the tubes 103 is set to be, e.g., an angle approximately ranging from 30 degrees to 60 degrees, and an inclination angle θb of the tubes 103 is set to be, e.g., an angle approximately ranging from 20 degrees to 25 degrees. As shown by the arrows α, the slurry discharge ports 104 discharge the slurry bilaterally symmetrically as seen in the plan view, in the directions of the angles θa, θb.

A boot 200 as shown in FIG. 11 has a vertical tube 201, a heel portion 202, a bifurcation part 205 and a pair of left and right slurry delivery tubes 203. The center axis Z-Z of the tube 201 generally in a cylindrical form is oriented in a vertical direction. The heel portion 202 curvedly extends from a lower end portion of the tube 201. The bifurcation part 205 is connected to a downstream end of the heel portion 202. The tubes 203 are connected to the bifurcation part 205. The bifurcation part 205 includes a bifurcating portion 206 which splits a slurry current Sa entering into the bifurcation part 205 from the heel portion 202. As shown in FIG. 11 (B), which is the cross-sectional view taken along line V-V of FIG. 11 (A), a wall surface region 207 is formed inside of the bifurcating portion 206 (inside of a fluid passage). The wall surface region 207 is substantially perpendicular to the slurry current Sa. The tube 203 is a rectilinear tube, which extends straightly in a direction substantially parallel with the center axis X-X of the production line of the gypsum board production apparatus, as seen in its plan view, and which extends somewhat obliquely downward from the bifurcation part 205, as seen in its side elevational view. As shown by the arrow α, each of the slurry discharge ports 204, which is an opening at a terminal end of each of the tubes 203, discharges the slurry in the direction substantially parallel with the conveying direction J of the sheet 110, as seen in the plan view.

CITATION LIST

Patent Literatures

[Patent Literature 1] International Publication of PCT Application No. WO00/56435
[Patent Literature 2] International Publication of PCT Application No. WO2004/026550
[Patent Literature 3] U.S. Pat. No. 6,494,609
[Patent Literature 4] Japanese Patent Laid-Open Publication No. 2001-300933
[Patent Literature 5] International Publication of PCT Application No. WO2014/087892
[Patent Literature 6] International Publication of PCT Application No. WO2004/103663
[Patent Literature 7] International Publications of PCT Application No. WO2013/063055 (Japanese patent laid-open publication No. 2014-530779)

SUMMARY OF INVENTION

Technical Problem

The bifurcation type or distribution type of boot, which discharges the slurry from the left and right slurry discharge ports in a pair, is advantageous for pouring and spreading the slurry on the sheet of paper for gypsum board liner, uniformly over the entire width of the sheet. However, a difference in a flow rate may occur between the slurries discharged through the respective ports, or a difference in the specific gravity may be caused between the slurries discharged through the respective ports. This is considered to be a phenomenon that derives from a directivity of the rotational movement of the slurry in the mixer, a directivity of the slurry outlet port of the mixer, a directivity or behavior of the slurry swirling flow in the chute, and so forth.

If the difference in the specific gravity is caused between the left and right discharge ports, a deviation of distribution, maldistribution or uneven distribution is apt to occur in the widthwise direction of the sheet of paper for gypsum board liner, with respect to the distribution of the specific gravity of the slurry fed on the sheet. This is undesirable for improvement of the product quality of the gypsum board product. Further, if the difference in the flow rate is caused between the discharge ports, a stagnation of the slurry, which results in a partial solidification of the slurry, is apt to occur in one of the delivery tubes with the flow rate being relatively low. This may result in production and adhesion of a gypsum lump, its hardened matter, its solidified matter, or the like in or to the tube. In a case where such a hardened gypsum lump is enlarged and is released onto the sheet, there is a possibility of an interruption of the operation of the production line, owing to paper breakage of the sheet, or a possibility of quality degradation of the gypsum board product or the like. In order to prevent such a problem from being caused, it is desirable to make a countermeasure for eliminating the difference in the flow rate between the ports.

Further, in the conventional structure of the slurry delivery conduit as shown in FIG. 10, the slurry flow delivered through each of the slurry discharge ports is directed obliquely outward of the sheet as seen in the plan view, and therefore, a part of the slurry may scatter or spread to the outside of the sheet, owing to the strength of the slurry flow, and such a slurry may be hardened outside of the sheet. This results in necessity of cleaning operation and so forth for removing the hardened gypsum lump adhered to a conveying table, a machine frame and so forth.

Such a phenomenon that the slurry scatters or spreads to the outside of the sheet might be able to be overcome by orienting the delivery tube toward a direction parallel with the center axis of the production line and directing the discharged slurry toward a direction substantially parallel with the conveying direction of the sheet, as in the structure of the slurry delivery conduit shown in FIG. 11. In the structure of the slurry delivery conduit shown in FIG. 11, however, a wall surface region (indicated by the reference numeral 207 in FIG. 11 (B)) substantially perpendicular to the slurry current is configured inside of the bifurcating portion (in the fluid passage). Since a stagnation of the slurry occurs in the vicinity of this wall surface region, the gypsum lump, its hardened matter, its solidified matter, or the like is apt to be produced in the vicinity of the wall surface region and to be adhered to the wall surface region. As set forth above, if such a hardened gypsum lump is enlarged therein and is released onto the sheet, there is a possibility that the operation of the production line is interrupted owing to the paper breakage of the sheet, or a possibility that quality degradation of the gypsum board product or the like is caused. Therefore, provision of the wall surface region inducing the stagnation of the slurry is undesirable for improvement of productivity and quality of the gypsum board product. Further, the orientation of the slurry delivery tube in the direction parallel with the center axis of the production line results in a reduction of the distance between the left and right slurry discharge ports, and therefore, it becomes difficult to pour and spread the slurry uniformly throughout the width of the sheet. This impairs the advantages of the bifurcation type or distribution type of slurry delivery conduit.

An object of the present invention is to provide a slurry delivery conduit of a mixer and a slurry delivery method arranged to divide a current of a gypsum slurry prepared by the mixer and to discharge the slurry streams through a plurality of slurry discharge ports onto a sheet of paper for gypsum board liner, which can prevent the differences in the flow rate and the specific gravity of the slurry from occurring between the discharge ports, which can smoothly divide the slurry current without provision of an intratubular vertical wall surface region and so forth inducing a stagnation of the slurry in a branch part of the conduit, and also, which can ensure a sufficient distance between the discharge ports.

Another object of the present invention is to reduce a frequency of occurrence of scattering or spreading of the gypsum slurry to the outside of the sheet, or to prevent such a phenomenon from occurring.

Solution to Problem

The present invention provides a slurry delivery conduit of a mixer, which is provided on the mixer for mixing of a gypsum slurry to be fed onto a continuously conveyed sheet of paper for gypsum board liner and which is arranged to discharge the slurry introduced from a mixing area of the mixer, onto said sheet through a slurry discharge port, comprising:

a rectilinear tube segment into which the slurry is introduced from said mixing area, a branch part for branching the rectilinear tube segment, and a plurality of branch tube segments connected to the rectilinear tube segment through the branch part, wherein said rectilinear tube segment extends straightly on a downstream side in a conveying direction of said sheet to configure a rectilinear fluid passage for said slurry;

wherein adjacent tube wall portions of said branch tube segments join together at said branch part to configure a transverse or horizontal cross-section in a form of V-letter, and the adjacent branch tube segments extend from the branch part on the downstream side in the conveying direction, while diverging toward the downstream side at an angle in a range from 20 degrees to 150 degrees as seen in a plan view; and wherein said branch part splits an axial or rectilinear current of said slurry flowing out through said rectilinear tube segment and introduces branched streams of the slurry into said branch tube segments respectively, and each of the branch tube segments is provided with said slurry discharge port at a terminal end part of the branch tube segment on the downstream side, so as to discharge the branched stream through the port onto said sheet.

The present invention also provides a slurry delivery method in which a gypsum slurry introduced from a mixing area of a mixer for mixing of the gypsum slurry, is discharged onto a continuously conveyed sheet of paper for gypsum board liner, so that the slurry is continuously poured and spread on the sheet, comprising:

introducing the slurry of the mixing area to a rectilinear tube segment having a straight rectilinear fluid passage with a circular cross-section, thereby rectifying a flow of said slurry so as to be an axial or rectilinear current, introducing the axial or rectilinear current into a branch part to split the current into branched streams of the slurry to be introduced into a plurality of branch tube segments respectively, which extend divergently at an angle in a range from 20 degrees to 150 degrees as seen in a plan view, and discharging the slurry onto said sheet through slurry discharge ports provided at downstream end portions of said branch tube segments, respectively.

According to the arrangement of the present invention as set forth above, the slurry is introduced from the mixing area into the rectilinear tube segment for providing an axial or rectilinear current of the slurry, whereby the slurry flow is rectified therein. The branch part splits the axial or rectilinear current smoothly by a fluid passage in a form of V-letter. This fluid passage is configured by the tube wall portions of the adjacent branch tube segments, which join with each other to configure a transverse or horizontal cross-section in the form of V-letter. The resultant branched streams of the slurry, which move in directions divergent on the downstream side in the conveying direction of the sheet, are discharged from the slurry discharge ports of the branch tube segments, respectively. The distance between the slurry discharge ports can be desirably ensured by an appropriate setting of the joining angle of the branch tube segments. The branch part, which splits the axial or rectilinear current by the fluid passage in the form of V-letter, is not provided with a vertical wall surface region and so forth which may induce the stagnation of the slurry, and therefore, the production or adhesion of the gypsum lump, its hardened matter, its solidified matter, or the like, is surely avoidable.

Further, the slurry delivery conduit with the aforementioned arrangement is adapted to divide the slurry current at the branch part, after the slurry flow introduced from the mixing area is rectified in the rectilinear fluid passage of the rectilinear tube segment so as to be the axial or rectilinear current. The rectilinear tube segment, which rectifies the slurry flow in such a manner, acts as a buffer zone or buffer area, which at least partially eliminates or cancels a downstream sustainable or continuable effect of the rotational motion or behavior of the slurry generated on the upstream side of the slurry delivery conduit, or which prevents such an effect on the upstream fluid passage from being regenerated in the slurry delivery conduit. Thus, according to the structure of the slurry delivery conduit and the delivery method as set forth above, the differences in the flow rate and the specific gravity of the slurry can be prevented from occurring between the slurry discharge ports.

Preferably, the rectilinear tube segment has a fluid passage length in a range from 30 mm to 200 mm, and a tube-wall joint portion of the branch tube segments in the form of V-letter configures a counter-flow splitting or dividing element in an intratubular area of the branch part. A tapering point of the splitting or dividing element is directed against the axial or rectilinear current in the rectilinear tube segment so as to be oppositely faced against the current. If the fluid passage length of the rectilinear tube segment is set to be equal to or smaller than 30 mm, it is difficult to ensure a sufficient effect of the rectilinear tube segment which prevents the flow rate and the specific gravity of the slurry from differing between the slurry discharge ports. Therefore, it is preferable to increase the fluid passage length so as to avoid occurrence of the differences in the flow rate and the specific gravity between the ports. On the other hand, if the length of fluid passage is set to be excessively increased, the gypsum lump, its hardened matter, its solidified matter, or the like is apt to be adhered to the inside surface of the rectilinear tube segment, and also, it becomes difficult to preferably ensure the structural stability of support for the delivery conduit. Therefore, it is preferable that the fluid passage length of the rectilinear tube segment is set to be equal to or smaller than 200 mm, as set forth above.

More preferably, centers of the slurry discharge ports adjacent to each other are spaced apart from each other, at a distance of at least 150 mm in a widthwise direction of the sheet. In general, the width of the sheet is about 1 m, and such spacing of the ports allows the slurry to be poured and spread on the sheet, substantially uniformly.

In a preferred embodiment of the present invention, the center axis of the rectilinear tube segment is oriented in a direction substantially parallel with the conveying direction as seen in the plan view, and the branch tube segments are positioned bilaterally symmetrically with respect to the center axis. The term reading "substantially parallel" means that the direction may not be necessarily parallel strictly, but an error of plus or minus 5 degrees or so, or an error of plus or minus 10 degrees or so is permissible. Each of the branch tube segments has a discharge tube portion at its terminal end part, wherein the discharge tube portion extends, while bending widthwise inward of the sheet. Each of the discharge tube portions has the slurry discharge port, which is directed to deliver the slurry in a direction substantially parallel with the conveying direction as seen in the plan view. According to such an arrangement, the slurry can be discharged from the slurry discharge port onto the sheet in a direction substantially parallel with the conveying direction of the sheet as seen in the plan view, and therefore, the frequency of occurrence of scattering or spreading of the slurry to the outside of the sheet can be reduced, or such a phenomenon can be prevented from occurring.

Preferably, the slurry delivery conduit is provided with a supporting mechanism for supporting the branch tube segment or the discharge tube portion. This supporting mechanism comprises an annular member entirely enclosing an outer circumferential surface of the discharge tube portion or the branch tube segment, a suspending device for suspending the annular member, and a supporting device which is positioned in an area above the discharge tube portion or the branch tube segment and which supports an upper part of the suspending device. The suspending device is integral with the annular member, so that an angular position of the annular member is changed, depending on a rotational position of the suspending device. The supporting device rotatably supports the suspending device. As a slurry discharge direction of the slurry discharge port is changed in accordance with the angular position of the annular member in relation to the rotation of the suspending device, the slurry discharge direction of the port can be changed or adjusted by changing the angular position of the annular member.

More preferably, a vibration transmission member is integrally connected to the annular member, and a vibration element of a vibrator is connected to the vibration transmission member. A vibration of the vibration element transmits to the discharge tube portion through the vibration transmission member and the annular member.

Preferably, the slurry delivery conduit is provided with a tube-wall pushing mechanism or member which presses a tube wall of the vertical tube or the rectilinear tube segment so as to locally deform an intratubular fluid passage of the vertical tube or the rectilinear tube segment. The tube-wall pushing mechanism or member locally presses the tube wall of the intratubular fluid passage of the vertical tube or the rectilinear tube segment, so as to locally change a cross-section of the fluid passage of the vertical tube or the rectilinear tube segment. Since the deformation of the tube wall causes the cross-section of the fluid passage to be locally reduced, a velocity distribution of the slurry varies, or a stagnation zone, which may be locally caused in the slurry delivery conduit, disappears due to the change of the cross-section of the fluid passage. Therefore, according to the slurry delivery conduit with such a tube-wall pushing mechanism or member, the fluid flow characteristics or the velocity distribution of the slurry in the slurry delivery conduit can be improved for effective mixing of the slurry, or the stagnation zone of the slurry can be prevented from occurring, owing to the local deformation or transformation of the cross-section of the fluid passage. Thus, the lump of the gypsum slurry, its hardened matter, its solidified matter, or the like can be prevented from being generated or adhered in or to the slurry delivery conduit.

In a preferred embodiment of the present invention, the slurry delivery conduit is a piping element with a bifurcate or Y-letter form, which has a configuration and structure bilaterally symmetric with respect to a center axis of the gypsum board production apparatus, and the left and right slurry discharge ports in a pair are disposed in positions bilaterally symmetric with respect to the center axis of the gypsum board production apparatus, wherein the flow rates of the ports are set to be equal to each other. If desired, the diameters of the left and right branch tube segments may be varied to differ from each other so that the flow rates of the respective discharge ports are set to be the flow rates different from each other. Further, in spite of an initial setting such that the flow rates of the ports are equal to each other, there may be caused a phenomenon in that the flow rates of the left and right ports differ from each other, owing to an influence of the rotational motion of the slurry on the upstream side of the conduit and so forth. In such a case, the diameters of the left and right branch tube segments may be set to be different from each other, for adjusting the flow rates of the ports to be equal to each other.

From another aspect of the invention, the present invention provides a gypsum board production apparatus comprising the slurry delivery conduit with the arrangement as set forth above.

From yet another aspect of the invention, the present invention provides a method for producing a gypsum board with use of the slurry delivery method arranged as set forth above.

Advantageous Effects of Invention

According to the present invention, a slurry delivery conduit of a mixer and a slurry delivery method can be provided, which are arranged to divide a current of a gypsum slurry prepared by the mixer and to discharge the slurry through a plurality of slurry discharge ports onto a sheet of paper for gypsum board liner, wherein the differences in the flow rate and the specific gravity of the slurry can be prevented from occurring between the discharge ports, the slurry current can be smoothly divided without provision of a vertical wall surface region and so forth inducing a stagnation of the slurry inside of the bifurcation part of the conduit, and also, a sufficient distance can be ensured between the discharge ports.

Further, according to the present invention with the arrangement, which allows the gypsum slurry to be discharged through the slurry discharge ports in a direction substantially parallel with the conveying direction of the sheet of paper for gypsum board liner as seen in the plan view, the frequency of occurrence of scattering or spreading of the gypsum slurry to the outside of the sheet can be reduced, or such a phenomenon can be prevented from occurring.

BRIEF DESCRIPTION OF DRAWINGS

FIG. 1 is an explanatory process diagram partially and schematically illustrating a forming process of a gypsum board.

FIG. 2(A) is a partial plan view schematically illustrating an arrangement of a gypsum board production apparatus, and FIGS. 2(B) and 2(C) are a plan view and a transverse cross-sectional view illustrating a structure of a mixer.

FIG. 3 is a fragmentary sectional perspective view showing an internal structure of the mixer and a structure of a slurry delivery conduit.

FIG. 4 is a perspective view illustrating a structure of the slurry delivery conduit.

FIGS. 6 (A) and 6 (B) are cross-sectional views of the slurry delivery conduit taken along lines II-II and III-III of FIG. 5, and FIG. 6 (C) is a cross-sectional view taken along a line IV-IV of FIG. 6 (A).

FIGS. 7 (A) and 7 (B) are vertical and horizontal cross-sectional views of a tube supporting mechanism, which show a structure for supporting the Y-tube.

DESCRIPTION OF EMBODIMENT

Figure 5A:
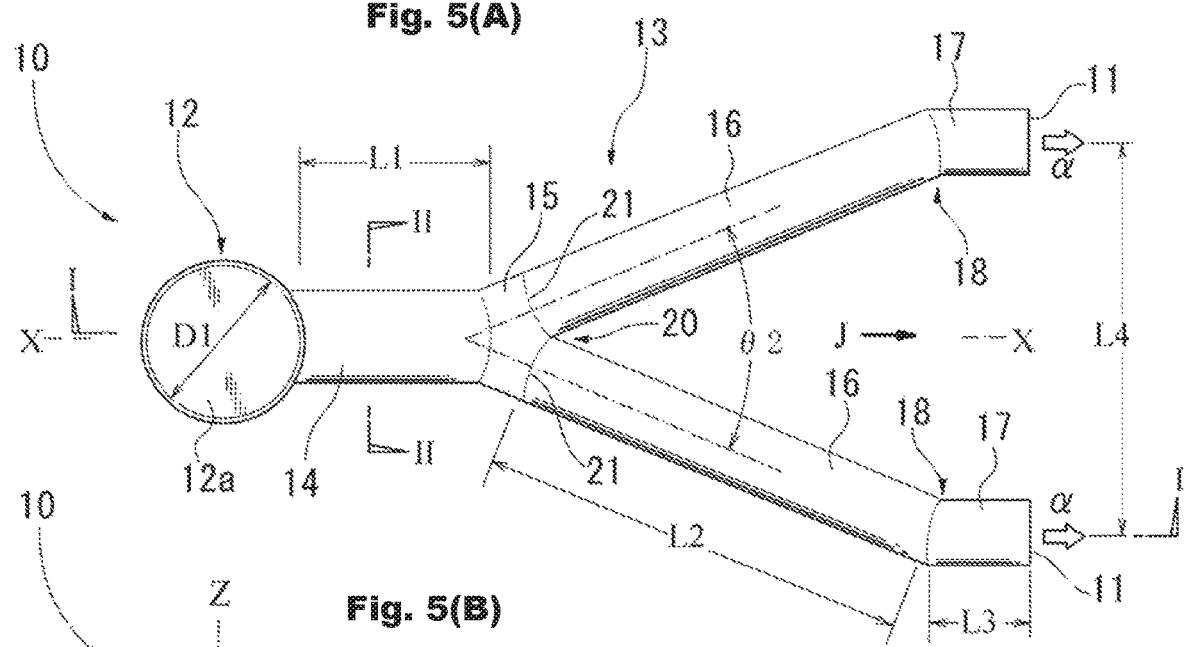
FIGS. 5 (A) and 5 (B) are a plan view and a side elevational view illustrating structures of a vertical tube and a Y-tube which embody the slurry delivery conduit, and FIG. 5 (C) is a cross-sectional view taken along lines I-I of FIG. 5 (A).

With reference to the attached drawings, preferred embodiments of the present invention are described in detail hereinafter.

FIG. 1 is an explanatory process diagram partially and schematically illustrating a forming process of a gypsum board. FIG. 2(A) is a partial plan view schematically illustrating an arrangement of a gypsum board production apparatus, and FIGS. 2(B) and 2(C) are a plan view and a transverse cross-sectional view, each illustrating a structure of a mixer. FIG. 3 is a fragmentary sectional perspective view showing an internal structure of the mixer and a structure of a slurry delivery conduit. In FIG. 3, the structure of the slurry delivery conduit is depicted, which discharges a slurry to a widthwise center area (a core zone) of a lower sheet of paper. Depictions of fractionation conduits and their slurry discharge ports, which discharge the slurry to widthwise end portions (edge zones) of the lower sheet, are omitted from FIG. 3.

As shown in FIGS. 1 and 2 (A), a gypsum board production apparatus is provided with a conveyor device, which conveys a lower sheet of paper 1 in a direction of an arrow J. The lower sheet 1 is a sheet of paper for gypsum board liner. The lower sheet 1 is conveyed along a manufacturing line. A mixer 5 is located in a predetermined position in relation to a conveying line. In this embodiment, the mixer 5 is positioned in an area immediately above a conveying table T, in line with a center axis X-X of the gypsum board production apparatus. Liquid (water) W and powder ingredients P, such as calcined gypsum, adhesive agent, set accelerator, additives, admixtures, and so forth, are fed to the mixer 5. The mixer 5 mixes these constituent materials. The mixer 5 feeds the resultant slurry (a calcined gypsum slurry) 3 (3a) onto the lower sheet 1 through a slurry delivery section 6 and a slurry delivery conduit 10, and feeds the slurry 3 (3b) onto the lower sheet 1 through fractionation conduits 7 (7a, 7a). The slurry delivery section 6 is so arranged that the slurry effluent from a peripheral zone of the mixer 5 is introduced into the slurry delivery conduit 10. The slurry delivery conduit 10 is so positioned as to deliver the slurry 3 (3a) from the section 6 to the widthwise center zone (the core zone) of the lower sheet 1 through each of slurry discharge ports 11 (referred to as "discharge ports 11" hereinafter). Piping of the fractionation conduits 7a, 7b is so arranged that the slurry 3 (3b) effluent from the peripheral zone of the mixer 5 is delivered to the widthwise end portions (the edge zones) of the lower sheet 1 through left and right slurry discharge ports 70.

The lower sheet 1 is conveyed together with the slurry 3 (3a, 3b) to reach forming rollers 8 (8a, 8b). An upper sheet of paper 2 travels partially around a periphery of the upper roller 8a to be redirected toward a conveying direction. The redirected upper sheet 2 is brought into contact with the slurry 3 on the lower sheet 1 and transferred in the conveying direction substantially in parallel with the lower sheet 1. A continuous belt-like three-layered formation 4 constituted from the sheets 1,2 and the slurry 3 is configured on a downstream side of the rollers 8. The continuous belt-like formation 4 runs continuously at a conveyance velocity V while a setting reaction of the slurry proceeds, until it reaches roughly cutting rollers 9 (9a, 9b). If desired, a variety of forming methods, such as a forming method with use of an extruder or a forming gate with a rectangular opening for a path of materials, may be employed, instead of the forming method with use of the forming rollers 8.

The cutting rollers 9 cut the continuous belt-like layered formation into boards, each having a predetermined length, whereby plates, each having a gypsum core covered with the sheets of paper for gypsum board liner, i.e., green boards for gypsum boards are produced. The green boards are conveyed toward the direction as shown by the arrow J, and are passed through a dryer (not shown) to be subjected to a forced drying process in the dryer, and thereafter, they are trimmed to be board products, each having a predetermined product length, and thus, gypsum board products are produced.

As shown in FIGS. 2(B), 2(C) and 3, the mixer 5 in this embodiment is a pin-type mixer which has a flattened cylindrical housing or casing 50 (referred to as "casing 50" hereinafter). An internal mixing area 51 for mixing the powder ingredients P and the liquid (water) W is defined in the casing 50. A lower end portion of a vertical rotary shaft 52 extends through a center part of an upper plate of the casing 50. An upper end portion (not shown) of the shaft 52 is connected with a rotary driving device, such as an electric motor (not shown), and is rotated in a predetermined rotational direction (a clockwise direction γ as seen in its plan view, in this embodiment).

A powder supply conduit PP for supply of the powder ingredients P to be mixed is connected to an upper plate of the casing, and a water supply conduit WP for supply of the mixing water W is also connected to the upper plate of the casing. On an opposite side of the slurry delivery section 6, fractionation ports 7 (7c, 7d) are provided on an annular wall 54 of the casing 50. The fractionation conduits 7a, 7b are connected to the ports 7c, 7d on the wall 54, respectively.

As shown in FIG. 2(C), a slurry outlet port 60 of the slurry delivery section 6 is positioned on the annular wall 54. A foam feeding conduit 65, which feeds a foam M to the slurry for adjustment of the specific gravity of the slurry, is connected to a hollow connector segment 61 of the section 6. A foam feeding port of the conduit 65 opens on an internal wall surface of the connector segment 61.

As shown in FIG. 3, a rotary disc 56 is rotatably positioned in the casing 50. A center part of the disc 56 is fixedly secured to an enlarged lower end portion of the shaft 52, and is rotated with rotation of the shaft 52 in a direction as indicated by the arrow γ (the clockwise direction). A number of gear tooth portions 57 are formed in a peripheral zone of the disc 56. A number of lower pins (movable pins) 58 are arranged on upper surfaces of the disc 56 and the gear tooth portions 57. A number of upper pins (stationary pins) 59 are fixed to an upper plate of the casing to depend therefrom in the internal mixing area 51. The upper and lower pins 58, 59 are alternately arranged in a radial direction of the disc 56, and during a rotational operation of the disc, the pins 58, 59 make relative motions so as to mix the raw materials fed into the casing 50 for production of the gypsum boards. Each of the gear tooth portions 57 presses or energizes the mixed fluid (i.e., the slurry) in a rotational and radially outward direction of the disc 56.

When the gypsum boards are to be produced, the rotary driving device (not shown) of the mixer 5 is operated to rotate the disc 56 in the direction of the arrow γ, and the ingredients (powder materials) P and the mixing water W to be mixed in the mixer 5 are fed into the mixer 5 through the conduits PP, WP. The powder ingredients P and the mixing water W are mixed in the mixing area 51 of the mixer 5, while moving radially outward on the disc 56 under an action of centrifugal force and moving in a circumferential direction in the peripheral zone.

A part of the slurry produced in the mixing area 51 is discharged through the conduits 7a, 7b onto the edge zones of the lower sheet 1, but most of the slurry produced in the mixing area 51 flows out through the slurry outlet port 60 to the hollow connector segment 61. A predetermined quantity of foam is fed to the slurry by the foam feeding port of the foam feeding conduit 65, and the slurry fed with the foam flows into a vertical cylindrical chute 62 of the slurry delivery section 6.

The slurry and the foam entering the chute 62 turn around a center axis of the chute 62, so that the slurry swirls along an inside circumferential wall surface of the chute 62. Owing to the turning or swirling motion of the slurry in the chute 62, the slurry and the foam are subjected to a shearing force, whereby they are mixed with each other, so that the foam is uniformly dispersed in the slurry. The slurry mixed with the foam in the chute 62 is discharged onto the lower sheet 1 through the slurry delivery conduit 10 (referred as "delivery conduit 10" hereinafter) connected to a lower end of the chute 62. As regards the structure of the chute 62, it is described in detail in PCT pamphlet No. WO2014/087892 (Patent Literature 5) which is an international publication of a PCT application filed by the same applicant, and therefore, a further detailed explanation thereof is omitted by referring to this PCT pamphlet.

As shown in FIG. 3, a vertical tube 12 of the delivery conduit 10 is concentrically and integrally connected to a lower side of the chute 62. A rectilinear tube segment 14 of a Y-tube 13 is integrally connected to an outer circumferential surface of a lower end portion of the vertical tube 12. As a whole, the Y-tube 13 has a bifurcate form or Y-letter configuration. The rectilinear tube segment 14 extends along the center axis X-X and bifurcates into a pair of left and right branch tube segments 16 branched by a bifurcation part 15. A set of the tube segments 16 extends in the direction of the arrow J, while diverging as a whole. Each of the tube segments 16 includes a discharge tube portion 17 at its terminal end part. Each of the discharge tube portions 17 is bent toward a direction substantially parallel with the center axis X-X, and is provided with the discharge port 11. In general, the delivery conduit 10 is a component of the gypsum board production apparatus, which can be called as a "boot", "discharge boot", "multi-leg boot", "bifurcate boot", and so forth. The delivery conduit 10 can be also expressed as a "chute" simply, since it may be deemed as a part of the vertical chute 62.

FIG. 4 is a perspective view illustrating a structure of the delivery conduit 10. FIGS. 5 and 6 include a plan view, a side elevational view and cross-sectional views taken along lines I-I, II-II, III-III and IV-IV respectively, which illustrate a structure of the vertical tube 12 and a structure of the Y-tube 13. FIG. 7 includes vertical and horizontal cross-sectional views showing a structure for supporting the Y-tube 13. With reference to FIGS. 4 to 7, the arrangement of the delivery conduit 10 is further explained hereinafter. Depictions of the fractionation conduits 7a, 7b and the slurry discharge ports 70 for discharging the slurry to the widthwise end portions (the edge zones) of the lower sheet 1 are omitted from FIG. 4.

As shown in FIG. 5, the vertical tube 12 is a piping element which is closed at its lower end portion by a horizontal bottom plate 12a and which has a cross-section in a form of a perfect circle. The tube 12 configures a vertical fluid passage having an equal or equivalent diameter (inner diameter) D1 as a whole. A vertically extending center axis Z-Z of the tube 12 is identical with a center axis of the vertical chute 62. The diameter D1 is set to be, for instance, a dimension in a range from 100 mm to 250 mm. The intratubular fluid passage of the tube 12 is in fluid communication with an intratubular area of the chute 62. The tube 12, as well as the chute 62, may have the center axis Z-Z somewhat inclined with respect to the vertical direction.

As shown in FIG. 5, an upstream end of the rectilinear tube segment 14 of the Y-tube 13 is connected to an outer circumferential surface of a lower end portion of the vertical tube 12. An intratubular fluid passage of the Y-tube 13 is in fluid communication with the intratubular fluid passage of the vertical tube 12. The Y-tube 13 is inclined downward at an angle θ1 as a whole, wherein the angle θ1 is set to be, for instance, an angle ranging from 10 degrees to 30 degrees. The rectilinear tube segment 14 is a piping element having a fluid passage with a uniform cross-section in a form of a perfect circle. A diameter (inner diameter) D2 of the intra-tubular fluid passage of the rectilinear tube segment 14 is set to be a dimension in a range from 50 mm to 150 mm. The fluid passage length or tube length L1 of the tube segment 14 is set to be a dimension in a range from 30 mm to 200 mm.

The rectilinear tube segment 14 is bifurcated into the left and right branch tube segments 16 in a pair, by the bifurcation part 15. The bifurcation part 15 bifurcates the fluid passage bilaterally symmetrically with respect to the center axis X-X. The branch angle θ2 of the branch tube segments 16 at the bifurcation part 15 is set to be an angle in a range from 25 degrees to 90 degrees, preferably in a range from 30 degrees to 60 degrees. The discharge tube portion 17 is in continuation with the branch tube segment 16 by a bending portion 18, which is bent substantially toward a direction of the center axis X-X. Circular openings at terminal ends of the discharge tube portions 17 open toward the conveying direction of the lower sheet 1 (the direction of the arrow J), in a position slightly spaced upward from the lower sheet 1, thereby forming the left and right discharge ports 11 in a pair. A distance L4 between the ports 11 is set to be a dimension in a range from 150 mm to 600 mm.

A diameter (internal diameter) D3 of the intratubular fluid passage in each of the branch tube segments 16 and the discharge tube portion 17 is set to be a dimension in a range from 30 mm to 100 mm. The internal diameter of each of the discharge ports 11 is the same as the diameter D3. A length L2 of the fluid passage of the branch tube segment 16 is set to be a dimension in a range from 150 mm to 600 mm, and a length L3 of the fluid passage of the discharge tube portion 17 is set to be a dimension in a range from 50 mm to 300 mm.

Each of the vertical tube 12 and the Y-tube 13 has integrally assembled structure of piping elements, or an integrally assembled structure of piping elements, plates and so forth, wherein the piping elements, plates and so forth made of a flexible material, such as rubber, elastomer or synthetic resin, have been appropriately cut and fabricated, and then, integrally combined by a jointing method, such as adhesive bonding, fusion bonding or welding. Each of the angles θ1, θ2 has been preset by combining the piping elements with each other in a suitable relative angle, and a difference (D2-D3) between the diameters of the tubes 14, 16 has been compensated with the structure and configuration of the bifurcation part 15.

Figure 5B:
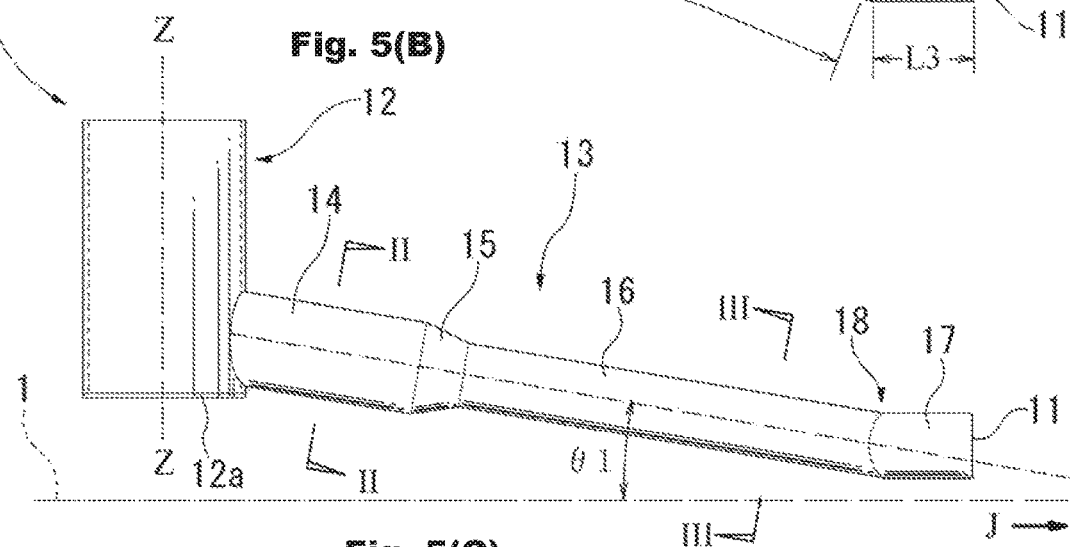
Figure 5C:
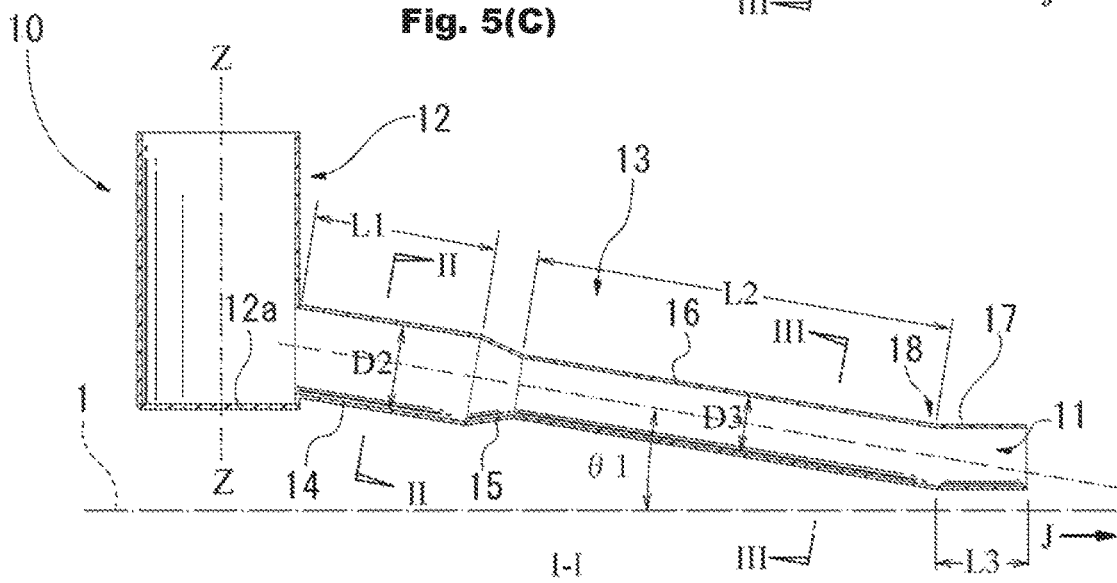

As shown in FIG. 5(A), the left and right branch tube segments 16 extend from the bifurcation part 15 on the downstream side in the conveying direction of the lower sheet, in such a manner that the branch tube segments 16 diverge in a form of V-letter. Tube walls 16a of the branch tube segments 16 join with each other at a joint portion 20 and join with the bifurcation part 15 along joint lines 21. As shown in FIG. 6(C), the left and right tube walls 16a joining at the angle θ2 in the joint portion 20 configure a bifurcating fluid passage having a cross-section in a form of V-letter, in an intratubular area of the bifurcation part 15. The tube walls 16a also form a counter-current splitting or dividing element 22 (referred to as "splitting element 22" hereinafter) on the intratubular side of the joint portion 20. The splitting element 22 has a horizontal or transverse cross-section in a form of V-letter. A tapering point of the splitting element 22 positioned on the center axis X-X is directed to be oppositely faced against a slurry main axial current or a slurry rectilinear current S (referred to as "slurry main axial current S" hereinafter) in the rectilinear tube segment 14. The slurry main axial current S is spit or divided into bilaterally symmetrically branched slurry streams S1, S2 by the splitting element 22. Each of the slurry streams S1, S2 is discharged onto the lower sheet 1 through each of the left and right discharge ports 11, as set forth above.

The splitting element 22 is not provided with a vertical wall surface or the like, which might, otherwise, result in occurrence of a stagnation of the gypsum slurry, and therefore, a lump of the gypsum slurry, its hardened matter, its solidified matter, or the like can be surely prevented from being produced therein. Furthermore, the gypsum slurry introduced from the vertical chute 62 into the vertical tube 12 is rectified so as to be an axial current or a rectilinear current, in a rectilinear fluid passage of the rectilinear tube segment 14, and thereafter, the current is divided into streams at the bifurcation part. An effect of a rotational motion of the gypsum slurry and so forth, which occurs in the mixing area 51, the vertical chute 62 and so forth, is substantially eliminated or cancelled in the rectilinear fluid passage of the rectilinear tube segment 14. Therefore, a substantial difference in the flow rate between the slurry streams S1, S2 can be prevented from occurring significantly. Also, the specific gravities of the gypsum slurries discharged from the slurry discharge ports 11 onto the lower sheet 1 can be prevented from being substantially different from each other between these ports 11.

Furthermore, each of the branch tube segments 16 is arranged in continuation to the discharge tube portion 17 through the bending portion 18 (FIG. 5), and a terminal end opening of the tube segment 17, i.e., the discharge port 11 opens toward the conveying direction of the lower sheet 1 (the direction of the arrow J). Therefore, a phenomenon that results in scattering or spreading of the gypsum slurry out of the lower sheet 1 is hardly caused.

As an experiment for testing an effect of the present invention, the present inventors, et al. carried out a test for researching a relationship between the flow passage length L1 of the rectilinear tube segment 14 and the difference in the specific gravity, wherein the latter is the difference in the specific gravity which occurs between the slurries discharged from the respective discharge ports 11. The relationship between the length L1 and the difference in the specific gravity obtained from the test is shown in the table below, wherein "0.00" means that the difference in the specific gravity was undetectable.

| Length L1 | Difference in the specific gravity |
| --- | --- |
| 0 mm | 0.03 |
| 30 mm | 0.01 |
| 60 mm | 0.01 |
| 100 mm | 0.01 |
| 200 mm | 0.00 |
| 250 mm | 0.00 |

In general, it is preferable that the difference in the specific gravity is equal to or smaller than 0.02, and therefore, the length of fluid passage L1 is preferably set to be equal to or greater than 30 mm.

As regards the phenomenon that results in scattering or spreading of the gypsum slurry to an outside area of the lower sheet 1, the present inventors, et al. also carried out a test for comparing the Y-tube 13 according to the present embodiment and a comparative example of the Y-tube. In the test, the prepared Y-tube 13 of the present embodiment is provided with the discharge tube portions 17 which is formed by bending terminal end parts of the branch tube segments 16 at the bending portions 18, whereas the prepared Y-tube of the comparative example has terminal end parts of the branch tube segments 16 straightly extending in continuation to the discharge tube portions 17 without bending the terminal end parts by such bending portions.

In a case where the gypsum board production machine is installed with the Y-tube 13 according to the present embodiment, the frequency of cleaning operations for removing the scattering or spreading gypsum slurry on the conveying table T and so forth was two times per eight hours. On the other hand, in a case where the gypsum board production machine is installed with the Y-tube of the comparative example, the frequency of cleaning operations for removing the scattering or spreading gypsum slurry on the conveying table T and so forth was twelve times per eight hours. Thus, it has been confirmed that the arrangement, in which the terminal end parts of the branch tube segments 16 are bent by the bending portions 18 so as to redirect each of the slurry discharge ports 11 toward a direction parallel with the conveying direction J, is an effective countermeasure for reducing the frequency of the phenomenon that results in scattering or spreading of the gypsum slurry to the outside area of the lower sheet 1, or preventing such a phenomenon from occurring.

As shown in FIG. 4, a bracket assembly 30 and a set of support assemblies 40 for positioning and supporting the Y-tube 13 in a preset position is provided in an area above the Y-tube 13. The bracket assembly 30 comprises a base part 31 fixed to the vertical chute 62, an L-shaped supporting element 32 supported by the base part 31, and a supporting plate 33 horizontally protruding from the element 32 in a direction of the arrow J. The base part 31 may be fixed to the casing 50 or a frame (not shown) of the gypsum board production apparatus for supporting the casing 50. The left and right support assemblies 40 in a pair are fixed to the plate 33 at their proximal ends, respectively. The part 31, the element 32 and the plate 33 are metal components, such as components made of stainless steel.

The support assemblies 40 are provided with a pair of left and right supporting elements 41, each being in a form of a rail; fully-threaded bolts 43; tube support elements 44, each being in an annular form; and vibration transmission plates 45. The assemblies 40 constitute a supporting mechanism for the discharge tube portions 17. Each of the supporting elements 41 is fixed to the supporting plate 33 by a nut and bolt assembly 42. The fully-threaded bolt 43 is suspended by the supporting element 41. Each of the tube support elements 44 is positioned at a lower end portion of each of the fully-threaded bolts 43. Each of the vibration transmission plates 45 is integral with each of the tube support elements 44. The discharge tube portion 17 extends through the tube support element 44. A tube wall of the discharge tube portion 17 fits in the element 44 with a buffer material (not shown) being provided on an inside circumferential wall of the element 44. A vibrator 46 is attached to each of the left and right plates 45. A compressed air supply conduit 47 is connected to each of the vibrators 46. A compressed air discharge conduit 48 for discharging the compressed air is also connected to each of the vibrators 46. The conduit 47 is connected to a compressed air supply source, such as an air compressor (not shown).

The supporting element 41 has a slit, slot or elongated opening 41a (referred to as "slit 41a" hereinafter), which is positioned immediately above a center line of the tube segment of the Y-tube 13. As shown in FIG. 7(A), an upper end portion of the fully-threaded bolt 43 (referred to as "bolt 43" hereinafter) extends through the slit 41a. Nuts 49a, 49b are screwed on the bolt 43 on upper and lower sides of the supporting element 41 respectively. The nuts 49a, 49b can be tightened to upper and lower surfaces of the supporting element 44, with each of washers 49c, 49d being interposed between the upper or lower surface and the nut, whereby the upper end portion of the bolt 43 can be fixedly secured to the supporting element 41.

The bolt 43 depends from the supporting element 44 to be integrally connected to a long nut 45a of the vibration transmission plate 45. A body 45b of the plate 45 is integral with the tube support element 44. A vibration is transmitted from a vibration element of the vibrator 46 (illustrated by one dotted chain lines) to the element 44 by the plate 45, and then, the vibration is transmitted from the element 44 to the slurry in the intratubular fluid passage through the discharge tube portion 17.

When the nuts 49a, 49b are loosened and the bolt 43 is turned as shown by the arrow η in FIG. 7, the direction of the discharge port 11 is changed laterally of the lower sheet 1 as shown by the arrow λ in FIG. 7 (B). Therefore, the nuts 49a, 49b are slightly loosened and the bolt 43 is turned in a desired direction, and then, the nuts 49a, 49b are tightened again, whereby a direction α of the slurry discharged from the discharge port 11 can be finely adjusted laterally of the lower sheet 1.

Figure 8A:
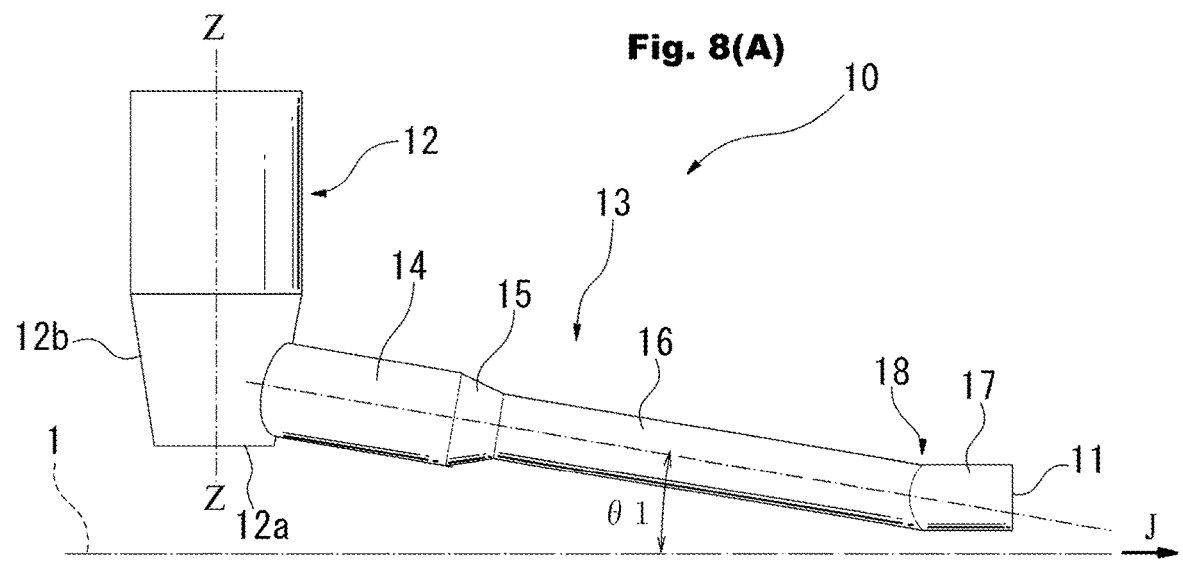
FIGS. 8 (A), 8 (B) and 8 (C) are side elevational views, each showing a modification of the slurry delivery conduit.
Figure 8B:
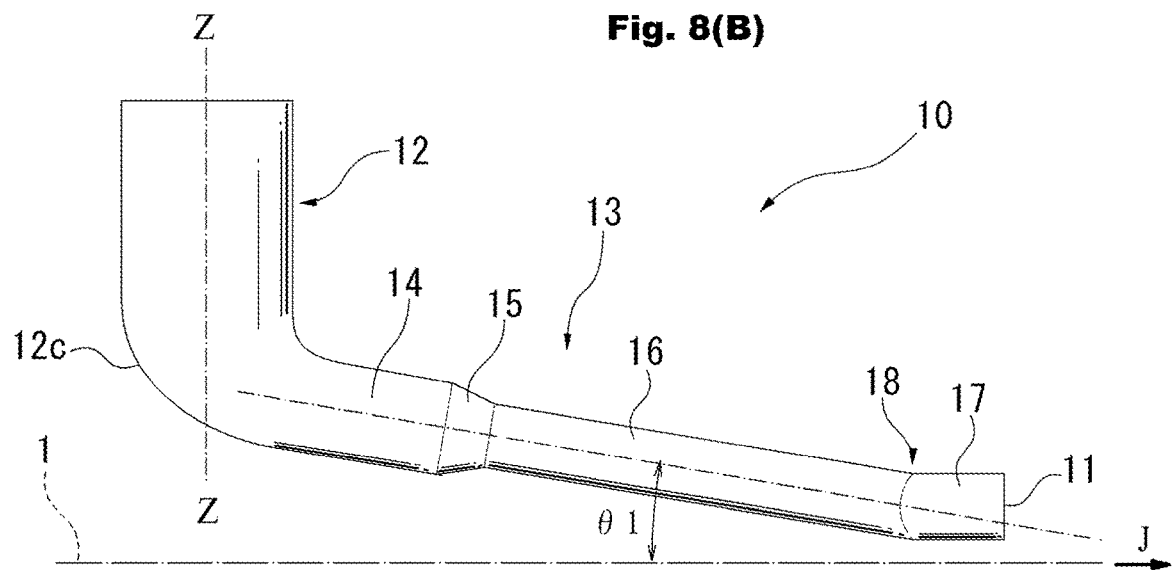
Figure 8C:
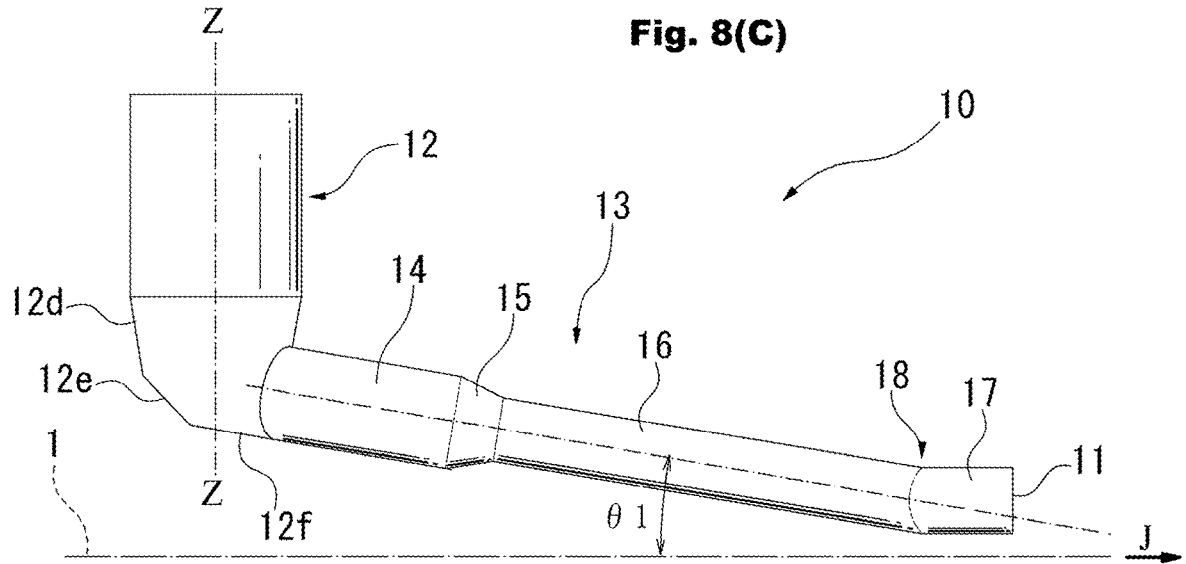
Figure 9A:
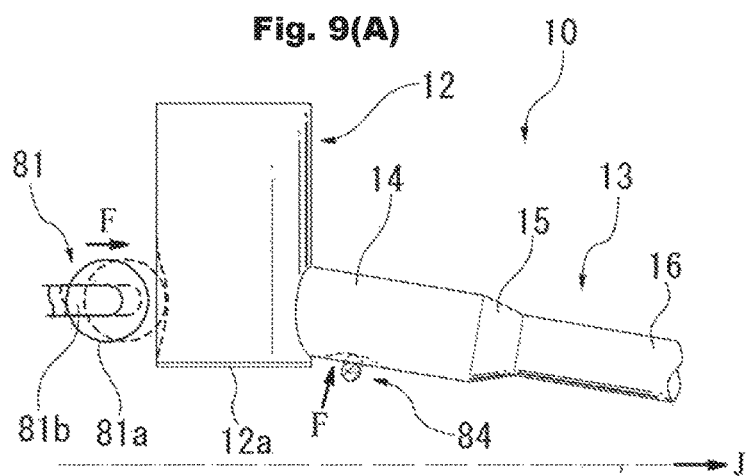
FIGS. 9 (A), 9 (B) and 9 (C) are side elevational views of the slurry delivery conduit provided with a mechanism or member for pushing a tube wall, and FIGS. 9 (D) through 9 (G) are partial cross-sectional views, each showing a deformed state of the tube wall conceptually.
Figure 9D:
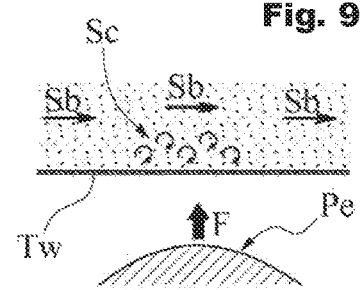
Figure 9B:
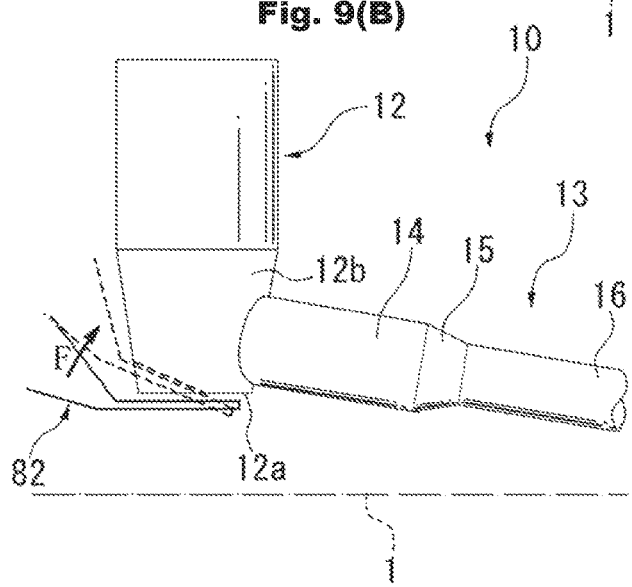
Figure 9F:
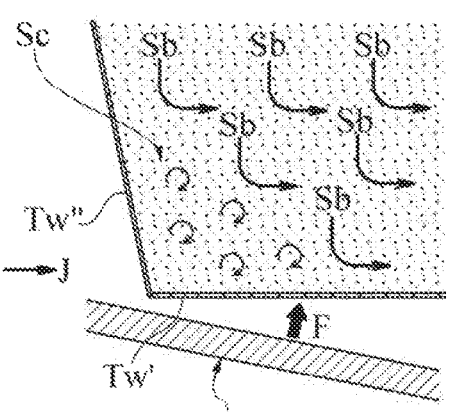
Figure 9C:
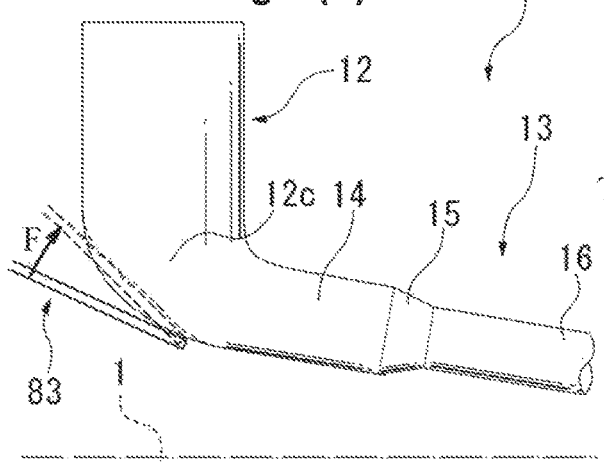
Figure 9G:
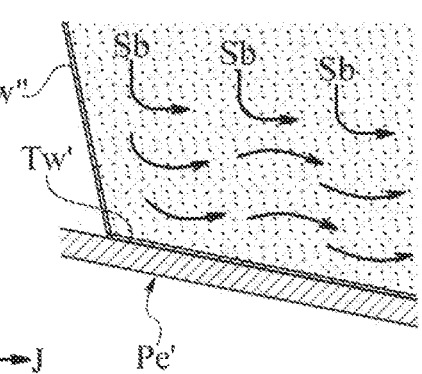
Figure 10A:
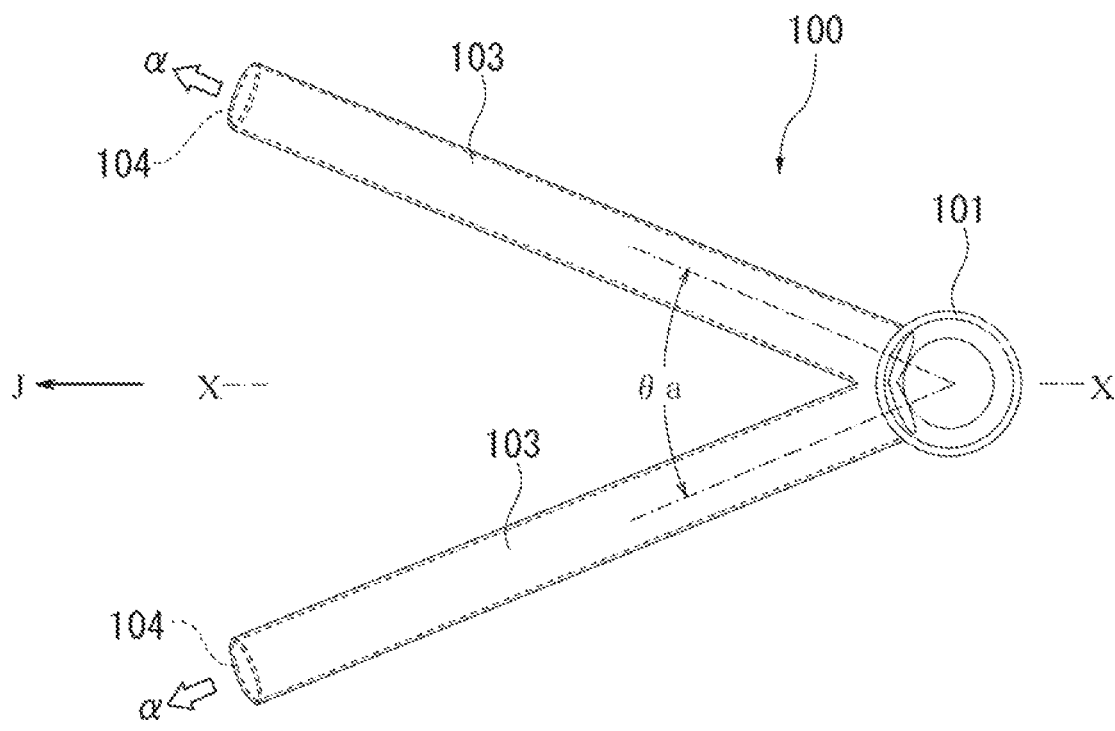
FIGS. 10 (A) and 10 (B) are a plan view and a side elevational view showing a structure of the conventional slurry delivery conduit.
Figure 10B:
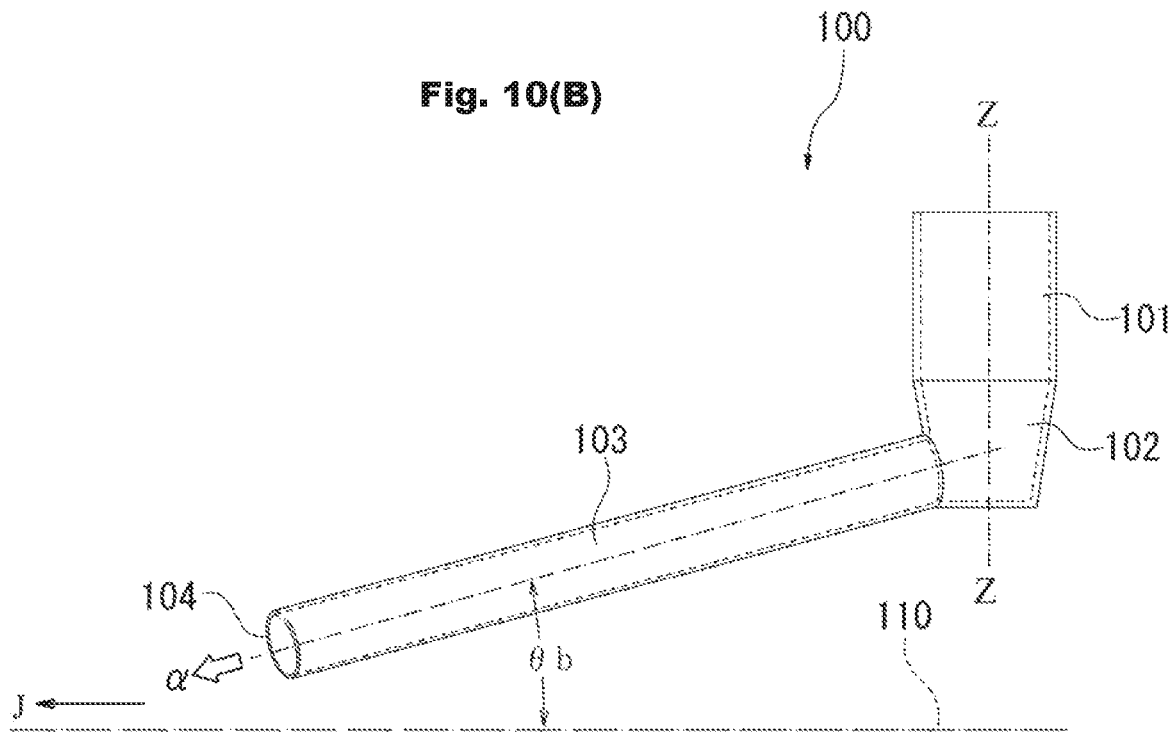
Figure 11A:
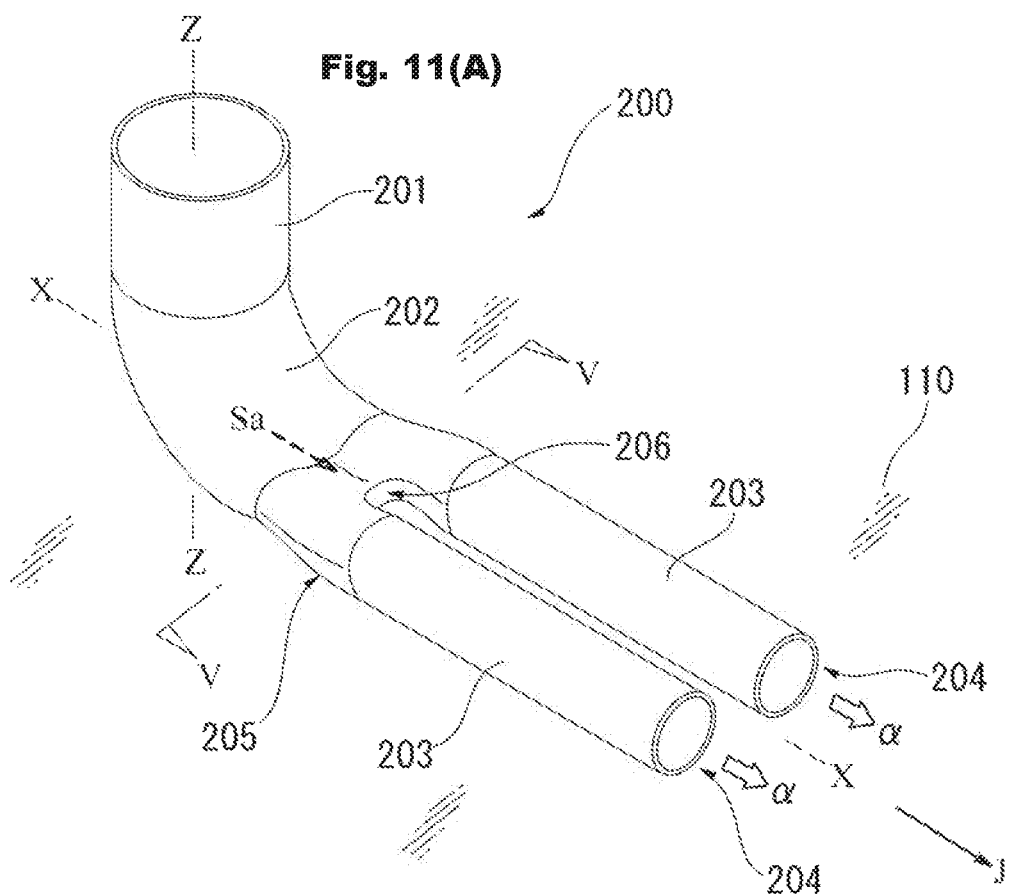
FIG. 11 (A) is a perspective view showing a structure of another conventional slurry delivery conduit and FIG. 11 (B) is a cross-sectional view taken along line V-V of FIG. 11 (A).
Figure 11B:
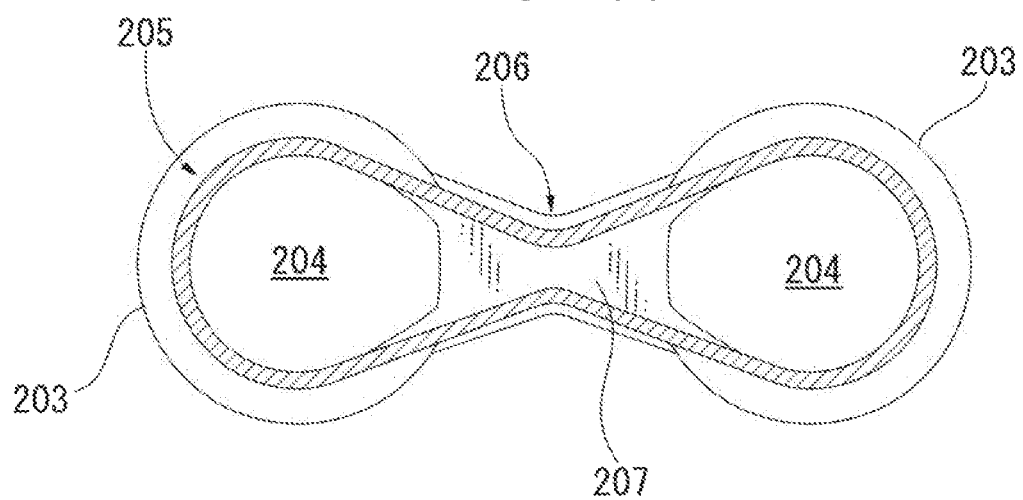

FIG. 8 includes side elevational views of the slurry delivery conduits, each showing a modification of the delivery conduit 10.

The delivery conduit 10 as shown in FIG. 8(A) has the vertical tube 12 with a lower part 12b reduced in its diameter, and the rectilinear tube segment 14 of the Y-tube 13 is connected to the part 12b. The vertical tube 12 of the delivery conduit 10 as shown in FIG. 8(B) has the vertical conduit 12 with a gently curved lower part 12c. The part 12c is gradually reduced in its diameter and is in continuation with the rectilinear tube segment 14 of the Y-tube 13. The vertical tube 12 of the delivery conduit 10 as shown in FIG. 8 (C) has a lower part 12d reduced in its diameter, similarly to the vertical tube 12 as shown in FIG. 8(A), but the part 12d further includes inclined portions 12e, 12f which are so inclined as to deflect the gypsum slurry flowing down in the tube 12, toward the side of the rectilinear tube segment 14.

FIG. 9 is a side elevational view partially showing the delivery conduit 10, wherein the delivery conduit 10 is provided with a mechanism or member for pushing the tube wall (referred to as "tube-wall pushing device" hereinafter), which locally deforms the tube wall of the vertical tube 12 or the Y-tube 13.

The delivery conduit 10 as shown in FIG. 9 (A) is provided with the tube-wall pushing device 81 which presses the tube wall of the vertical tube 12 inward of its fluid passage. A part of the tube wall of the tube 12 located on the side opposite to the rectilinear tube segment 14 is pressed in a direction of an arrow F by a pressing part 81a of the device 81, so that the intratubular fluid passage of the tube 12 is deformed. The pressing part 81a is connected to an actuator 81b of a driving device which applies an external force to the pressing part 81a. As shown in FIG. 9 (A), the delivery conduit 10 may be provided with a tube-wall pushing device 84 which pushes the tube wall of the rectilinear tube segment 14 inward of the fluid passage (in a direction of the arrow F). In a state depicted in FIG. 9 (A), an underside of the delivery conduit 10 is pushed upwardly by the device 84. However, a lateral or upper side of the delivery conduit 10 may be pushed laterally or downwardly by the device 84.

The delivery conduit 10 as shown in each of FIG. 9 (B) and FIG. 9 (C) is provided with an inclined-plate-type of tube-wall pushing device 82, 83, which presses the horizontal bottom wall 12a, the reduced lower part 12b or the curved lower part 12c in an obliquely upward direction (a direction shown by the arrow F). Each of the devices 82, 83 locally deforms the horizontal bottom wall 12a and the reduced lower part 12b, or the curved lower part 12c, as shown by broken lines.

FIGS. 9 (D) through 9 (G) are conceptual diagrams, each showing such a deformation of the tube wall. In FIG. 9 (D), there are shown an intratubular slurry flow Sb moving along a tube wall Tw, and a stagnation zone Sc generated in proximity to the tube wall Tw. The tube wall Tw as shown in FIG. 9 (D) and FIG. 9 (E) is, e.g., the tube wall of the rectilinear tube segment 14 as shown in FIG. 9 (A). The zone Sc occurs, owing to, e.g., a significant reduction in the velocity of the slurry flow Sb, a locally generated vortex flow, or the like. As shown by the arrow F in FIG. 9 (D), when pressing elements Pe of the tube-wall pushing devices 81-84, e.g., the element Pe of the device 84 is pressed against a part of the tube wall Tw in the vicinity of the zone Sc, the tube wall Tw is deformed inward of the tube as shown in FIG. 9 (E). As a result, the velocity of the slurry flow in the vicinity of the zone Sc increases locally, and the zone Sc disappears.

In FIG. 9 (F), there is shown the stagnation zone Sc generated in proximity to a joint of the tube walls Tw', Tw", owing to a redirection of the slurry flow Sb. For instance, the tube walls Tw', Tw" are the horizontal bottom wall 12a and the tube wall of the reduced lower part 12b as shown in FIG. 9 (B), respectively. When the pressing element Pe' of the device 82 is pressed against a part of the tube wall Tw', Tw" in the vicinity of the zone Sc, the tube wall Tw', Tw" is deformed inward of the tube as shown in FIG. 9 (G). As a result, a velocity distribution of the slurry flow changes in the zone Sc and in the vicinity of the zone Sc, and the zone Sc disappears.

Thus, as the result of the deformation of the tube wall Tw, Tw', Tw" caused by the action of the device 81-84, the cross-section of the fluid passage of the delivery conduit 10 is locally reduced, whereby the velocity distribution of the gypsum slurry flow varies, or the stagnation zone, which is generated locally in the Y-tube, disappears. Therefore, according to the delivery conduit 10 with the tube-wall pushing device 81-84, the characteristics or the velocity distribution of the flow of the gypsum slurry can be improved for efficient mixing of the slurry, or the stagnation zone of the gypsum slurry can be prevented from occurring in the delivery conduit, due to the local deformation or transformation of the cross-section of the delivery conduit. As a result, the lump of the gypsum slurry, its hardened matter, its solidified matter, or the like can be prevented from generating in the fluid passage of the delivery conduit 10 or clinging onto the tube wall of the delivery conduit 10 and so forth.

Although the present invention has been described as to a preferred embodiments or examples, the present invention is not limited thereto, but may be carried out in any of various changes or variations without departing from the scope of the invention as defined in the accompanying claims.

For instance, the arrangement of the mixer according to the present invention can be equally applied to a mixer other than the pin-type mixer, such as a scraper-type mixer, or a pinless mixer (a vane-type mixer or the like).

In the embodiments as set forth above, the center axes of the vertical chute and vertical tube are oriented vertically, but the center axis of the chute or the tube may be inclined.

In the embodiments as set forth above, the vertical tube and the Y-tube are piping elements made of a flexible material, such as rubber, elastomer or synthetic resin. However, the vertical tube and the slurry delivery conduit may be produced by integrally assembling metal pipes or metallic materials, such as stainless steel pipes and stainless steel plates, with use of a jointing method, such as a welding method for metal pipes.

In the embodiments as set forth above, the mixer is equipped with the vertical chute, which is attached to the slurry outlet port on the annular wall of the casing of the mixer. However, the present invention can be similarly applicable to a mixer with a different arrangement, such as a mixer having a tubular passage for transporting the slurry, which is transversely connected to the slurry outlet port provided on the annular wall of the casing, or a mixer having a slurry delivery tubular passage vertically connected to the slurry outlet port on the lower plate of the casing.

INDUSTRIAL APPLICABILITY

The present invention can be applied to a slurry delivery conduit and a slurry delivery method for a mixer which are so arranged that a current of a gypsum slurry prepared by the mixer is divided into streams and is discharged through a plurality of slurry discharge ports onto a sheet of paper for gypsum board liner. According to the present invention, a flow of the slurry can be suitably straighten or rectified, whereby the flow rate and the specific gravity of the slurry can be prevented from differing between the discharge ports; the slurry current can be divided smoothly without a factor of stagnation of the gypsum slurry being provided at a branch part of the delivery conduit; and the sufficient distance can be ensured between the discharge ports. Furthermore, according to the present invention, a discharge direction of the slurry can be suitably preset or adjusted, so that a frequency of occurrence of scattering or spreading of the gypsum slurry to the outside of the sheet of paper can be reduced, or such a phenomenon can be prevented from occurring. Therefore, the practical advantage of the present invention is remarkable.

Also, the present invention can be applied to an apparatus and method for producing a gypsum board which is arranged to pour and spread the gypsum slurry onto the sheet of paper for gypsum board liner with use of such a slurry delivery conduit.

REFERENCE SIGNS LIST

1 lower sheet of paper
2 upper sheet of paper
3 slurry
5 mixer
6 vertical chute
10 slurry delivery conduit
11 slurry discharge port
12 vertical tube
13 Y-tube
14 rectilinear tube segment
15 bifurcation part
16 branch tube segment
17 discharge tube portion 18 bending portion
20 joint portion
22 counter-current splitting or dividing element
30 bracket assembly
40 support assembly
50 casing
51 internal mixing area
81-84 tube-wall pushing device (tube-wall pushing mechanism or member)
α direction of discharged slurry
θ1, θ2 angle
D1-D3 diameter
L1-L3 fluid passage length
L4 spaced distance
J conveying direction of sheet of paper for gypsum board liner
S slurry main axial current or slurry rectilinear current
S1, S2 branched slurry stream
X-X center axis of gypsum board production apparatus

The invention claimed is:

1. A slurry delivery conduit for a mixer having a mixing area for mixing of a gypsum slurry to be fed onto a continuously conveyed sheet of paper for gypsum board liner, the conduit configuring a curved or L-shape fluid passage to discharge the slurry introduced from the mixing area, onto said sheet through a slurry discharge port, comprising:
a tube having a center axis extending along a vertical direction, into which the slurry prepared in the mixing area is introduced,
a rectilinear tube segment, which is in fluid communication with a fluid passage in said tube so that the slurry is introduced from the tube into the rectilinear tube segment,
a branch part for branching the rectilinear tube segment, and
a plurality of branch tube segments connected to the rectilinear tube segment through the branch part,
wherein said rectilinear tube segment extends straightly on a downstream side in a conveying direction of said sheet to configure a rectilinear fluid passage for said slurry;
wherein adjacent tube wall portions of said branch tube segments join together at said branch part to configure a V-shaped transverse or horizontal cross-section, and the adjacent branch tube segments extend from the branch part on the downstream side in the conveying direction, while diverging toward the downstream side at an angle in a range from 20 degrees to 150 degrees as seen in a plan view; and
wherein said branch part splits an axial or rectilinear current of said slurry flowing out through said rectilinear tube segment and introduces branched streams of the slurry into said branch tube segments respectively, and each of the branch tube segments is provided with said slurry discharge port at a terminal end part of the branch tube segment on the downstream side, so as to discharge the branched stream through the port onto said sheet.

2. The slurry delivery conduit as defined in claim 1, wherein said rectilinear tube segment has a fluid passage length in a range from 30 mm to 200 mm.

3. The slurry delivery conduit as defined in claim 1, wherein a tube-wall joint portion of said branch tube segments connected to each other to configure the V-shaped transverse or horizontal cross-section, configures a counter-flow splitting or dividing element in an intratubular area of said branch part in such a manner that a tapering point of the splitting or dividing element is directed against said axial or rectilinear current in said rectilinear tube segment to be oppositely faced against the current.

4. The slurry delivery conduit as defined in in claim 1, wherein a center axis of said rectilinear tube segment is oriented in a direction substantially parallel with the conveying direction as seen in a plan view, said branch tube segments are positioned bilaterally symmetrically with respect to said center axis, each of the branch tube segments includes a discharge tube portion at its terminal end part, the discharge tube portion extends, while bending widthwise inward of said sheet, and each of the discharge tube portions has said slurry discharge port, which is directed to discharge the slurry in a direction substantially parallel with the conveying direction as seen in the plan view.

5. The slurry delivery conduit as defined in claim 1, further comprising a supporting mechanism for supporting said branch tube segment or its discharge tube portion, wherein the supporting mechanism includes an annular member entirely enclosing an outer circumferential surface of the branch tube segment or the discharge tube portion, a suspending device for suspending the annular member, and a supporting device positioned in an area above the branch tube segment or the discharge tube portion and supporting an upper part of the suspending device, and wherein the suspending device is integral with the annular member so that an angular position of the annular member is changed, depending on a rotational position of the suspending device, the supporting device rotatably supports the suspending device, and a slurry discharge direction of said slurry discharge port is changed in accordance with the angular position of the annular member in relation to rotation of the suspending device.

6. The slurry delivery conduit as defined in claim 5, wherein a vibration element of a vibrator is connected to a vibration transmission member for transfer of a vibration, and the vibration transmission member is integrally connected to said annular member, whereby the vibration of the vibration element transmits to said discharge tube portion through the vibration transmission member and the annular member.

7. The slurry delivery conduit as defined in claim 1, further comprising a tube-wall pushing mechanism or member which presses a tube wall of said tube or said rectilinear tube segment to locally deform the tube wall, so as to locally deform an intratubular fluid passage of the tube and/or the rectilinear tube segment.

8. The slurry delivery conduit as defined in claim 1, wherein centers of said slurry discharge ports adjacent to each other are spaced apart from each other, at a distance of at least 150 mm in a widthwise direction of said sheet.

9. The slurry delivery conduit as defined in claim 1, wherein said branch tube segments have different diameters for adjustment of a flow rate of each of said slurry discharge ports.

10. A slurry delivery method in which a gypsum slurry is introduced into a slurry delivery conduit from a mixing area of a mixer for mixing of the gypsum slurry, the conduit configuring a curved or L-shaped fluid passage, and the gypsum slurry is discharged through slurry discharge ports of the slurry delivery conduit onto a continuously conveyed sheet of paper for gypsum board liner, so that the slurry is continuously poured and spread on the sheet, comprising:
introducing said slurry prepared in the mixing area, into a tube of the slurry delivery conduit having a center axis extending along a vertical direction, introducing the slurry from said tube into a straight rectilinear fluid passage of a rectilinear tube segment which is in fluid communication with a fluid passage in the vertical tube and which has a circular cross-section, thereby rectifying a flow of said slurry so as to be an axial or rectilinear current, introducing the axial or rectilinear current of the slurry into a branch part to split the current into branched streams of the slurry by a tube-wall joint portion of branch tube segments connected to each to form a V-shape thereby introducing the slurry into the branch tube segments respectively, which extend divergently at an angle in a range from 20 degrees to 150 degrees as seen in a plan view, and discharging the slurry onto said sheet through said slurry discharge ports provided at downstream end portions of said branch tube segments, respectively.

11. The slurry delivery method as defined in claim 10, wherein said rectilinear tube segment has a fluid passage length in a range from 30 mm to 200 mm.

12. The slurry delivery method as defined in claim 10, wherein a said tube-wall joint portion configures a counter-flow splitting or dividing element in an intratubular area of said branch part, and a tapering point of the splitting or dividing element is directed against said axial or rectilinear current in said rectilinear tube segment to be oppositely faced against the current.

13. The slurry delivery method as defined in claim 10, wherein a center axis of said rectilinear tube segment is oriented in a direction substantially parallel with the conveying direction as seen in a plan view, the branch tube segments are positioned bilaterally symmetrically with respect to said center axis of the rectilinear tube segment, each of the branch tube segments has a discharge tube portion at its terminal end part, the discharge tube portion extends, while bending widthwise inward of said sheet, and each of the discharge tube portions has said slurry discharge port, which discharges the slurry onto the sheet in a direction substantially parallel with the conveying direction as seen in the plan view.

14. The slurry delivery method as defined in claim 13, wherein said discharge tube portion is supported by an annular member entirely enclosing an outer circumferential surface of the discharge tube portion, and an angular position of the annular member is changed to vary a slurry discharge direction of said slurry discharge port.

15. The slurry delivery method as defined in claim 14, wherein a vibration element of a vibrator is connected to said annular member for transfer of a vibration, so as to transmit the vibration of the vibrator to said discharge tube portion.

16. The slurry delivery method as defined in claim 10, further comprising a step of locally pressing a tube wall of said rectilinear tube segment and/or a tube wall of said tube, so as to locally deform a cross-section of a fluid passage of said rectilinear tube segment or the tube.

17. The slurry delivery method as defined in claim 10 wherein centers of the slurry discharge ports adjacent to each other are spaced apart from each other, at a distance of at least 150 mm in a widthwise direction of said sheet.

18. The slurry delivery method as defined in claim 10, wherein diameters of fluid passages of said branch tube segments are varied for adjustment of a flow rate of each of said slurry discharge ports.

19. A gypsum board production apparatus provided with the slurry delivery conduit as defined in claim 1.

20. A method for producing a gypsum board with use of the slurry delivery method as defined in claim 10.

* * * * *

UNITED STATES PATENT AND TRADEMARK OFFICE
CERTIFICATE OF CORRECTION

PATENT NO. : 11,565,439 B2
APPLICATION NO. : 16/644051
DATED : January 31, 2023
INVENTOR(S) : Katsumi Niimi et al.

It is certified that error appears in the above-identified patent and that said Letters Patent is hereby corrected as shown below:

In the Claims

Column 20, Line 5:
In Claim 4, delete "in in" and insert --in--.

Column 21, Line 22:
In Claim 12, after "wherein" delete "a".

Signed and Sealed this
Fourteenth Day of March, 2023

*Katherine Kelly Vidal*
Katherine Kelly Vidal
*Director of the United States Patent and Trademark Office*